US009374439B2

(12) United States Patent
Yasuma

(10) Patent No.: US 9,374,439 B2
(45) Date of Patent: Jun. 21, 2016

(54) INFORMATION PROCESSING APPARATUS AND CONTROL METHOD THEREOF, SERVICE PROVIDING APPARATUS AND CONTROL METHOD THEREOF, INFORMATION PROCESSING SYSTEM, INFORMATION PROCESSING METHOD, PROGRAM, AND RECORDING MEDIUM

(75) Inventor: Kensuke Yasuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 12/699,477

(22) Filed: Feb. 3, 2010

(65) Prior Publication Data

US 2010/0205312 A1   Aug. 12, 2010

(30) Foreign Application Priority Data

Feb. 10, 2009   (JP) ................. 2009-029115

(51) Int. Cl.
*G06F 15/16* (2006.01)
*H04L 29/08* (2006.01)
*H04L 12/28* (2006.01)

(52) U.S. Cl.
CPC ........ *H04L 67/2861* (2013.01); *H04L 12/2838* (2013.01); *H04L 2012/2849* (2013.01)

(58) Field of Classification Search
USPC ....................................................... 709/250
See application file for complete search history.

(56) References Cited

U.S. PATENT DOCUMENTS

| 8,085,743 B2 * | 12/2011 | Buer et al. ............ 370/338 |
| 2005/0128975 A1 * | 6/2005 | Kobayashi ............ H04W 8/04 370/328 |
| 2006/0018299 A1 * | 1/2006 | Yamamoto ............ H04W 8/065 370/349 |
| 2007/0078959 A1 * | 4/2007 | Ye ............................ 709/223 |
| 2008/0033962 A1 * | 2/2008 | Yamamoto et al. ............ 707/10 |

FOREIGN PATENT DOCUMENTS

| JP | 2006-221438 A | 8/2006 |
| JP | 2006-260425 | 9/2006 |
| JP | 2006-261853 A | 9/2006 |

(Continued)

OTHER PUBLICATIONS

A. Delphinato et al, Architecture of a bidirectional Bluetooth-UPnP Proxy, 2007, IEEE, pp. 34-38.*

(Continued)

*Primary Examiner* — Ryan Jakovac
(74) *Attorney, Agent, or Firm* — Cowan, Liebowitz & Latman, P.C.

(57) ABSTRACT

An information processing apparatus that provides a proxy for a service that a service providing apparatus provides to a control apparatus, the information processing apparatus includes: a first communications unit adapted to connect to a first communications path; a second communications unit adapted to connect to a second communications path; a first determination unit adapted to determine whether or not the providing apparatus exists via the first communications unit; a second determination unit adapted to determine whether or not the providing apparatus exists via the second communications unit; a connection unit adapted to connect to the providing apparatus via the second communications unit; and a proxy unit adapted to connect to the control apparatus via the first communications unit, and provide a proxy for a service between the providing apparatus and the control apparatus.

14 Claims, 15 Drawing Sheets

(56) References Cited

FOREIGN PATENT DOCUMENTS

| | | |
|---|---|---|
| JP | 2008-092129 A | 4/2008 |
| JP | 2008-160856 A | 7/2008 |
| JP | 2008-204210 A | 9/2008 |
| JP | 2010-186271 A | 8/2010 |

OTHER PUBLICATIONS

Greg Innes, "HOWTO: Set up your Panasonic IP Camera on your Wireless Network", Jul. 3, 2008, networkcams.com.*
Panasonic, "Operating Instructions for Network Camera", 2005.*
Klamra, Jakob et al, "Design and implementation of a power management proxy for universal plug and play." Proceedings of the Swedish National Computer Networking Workshop (SNOW). 2005.*
Cisco, Introduction to Mobile IP, Oct. 5, 2001.*
The above foreign patent documents were cited in the Aug. 29, 2014 Japanese Office Action, which is enclosed without an English Translation, that issued in Japanese Patent Application No. 2006-261853.
The above references were cited in a Apr. 25, 2016 Japanese Office Action, which is enclosed without an English Translation, that issued in Japanese Patent Application No. 2015-133124.

* cited by examiner

FIG. 7A

| UUID | NETWORK | STATUS | PROXY |
|---|---|---|---|
| uuid:98765432-1234-abcd-1234-000011112222 | Wireless LAN | alive | no |
| uuid:816c5df0-c2ed-11da-9216-0008741e9395 | Wireless LAN | alive | unknown |

| UUID | NETWORK | STATUS | PROXY |
|---|---|---|---|
| uuid:98765432-1234-abcd-1234-000011112222 | Wireless LAN | alive | no |
| uuid:816c5df0-c2ed-11da-9216-0008741e9395 | Wireless LAN | alive | yes |

| UUID | NETWORK | STATUS | PROXY |
|---|---|---|---|
| uuid:98765432-1234-abcd-1234-000011112222 | Wireless LAN | alive | no |
| uuid:816c5df0-c2ed-11da-9216-0008741e9395 | Wireless LAN | byebye | yes |

| UUID | NETWORK | STATUS | PROXY |
|---|---|---|---|
| uuid:98765432-1234-abcd-1234-000011112222 | Wireless LAN | alive | no |
| uuid:816c5df0-c2ed-11da-9216-0008741e9395 | Wireless LAN | byebye | yes |
| uuid:816c5df0-c2ed-11da-9216-0008741e9395 | Bluetooth | alive | yes |

1001

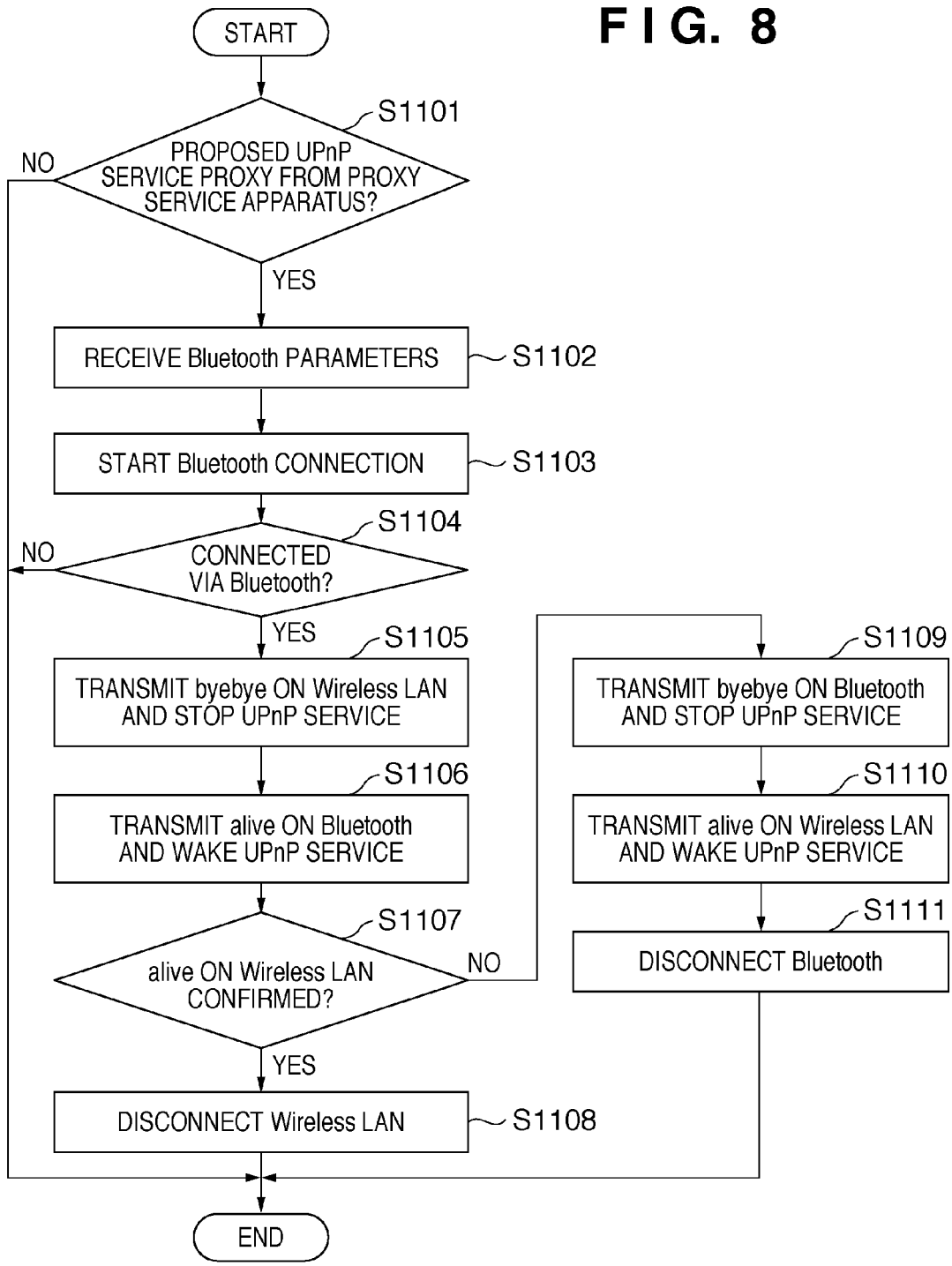

| UUID | NETWORK | STATUS | PROXY |
|---|---|---|---|
| uuid:98765432-1234-abcd-1234-000011112222 | Wireless LAN | alive | no |
| uuid:816c5df0-c2ed-11da-9216-0008741e9395 | Wireless LAN | byebye | yes |
| uuid:816c5df0-c2ed-11da-9216-0008741e9395 | Bluetooth | byebye | yes |

1301

| UUID | NETWORK | STATUS | PROXY |
|---|---|---|---|
| uuid:98765432-1234-abcd-1234-000011112222 | Wireless LAN | alive | no |

# INFORMATION PROCESSING APPARATUS AND CONTROL METHOD THEREOF, SERVICE PROVIDING APPARATUS AND CONTROL METHOD THEREOF, INFORMATION PROCESSING SYSTEM, INFORMATION PROCESSING METHOD, PROGRAM, AND RECORDING MEDIUM

BACKGROUND OF THE INVENTION

1. Field of the Invention

The present invention relates to an information processing apparatus and a control method thereof, a service providing apparatus and a control method thereof, an information processing system, an information processing method, a program, and a recording medium.

2. Description of the Related Art

Recently, attention has been focused on UPnP (Universal Plug and Play), whereby it is possible to discover and use a household device by employing plug and play technology. In UPnP, there exists a UPnP service that provides a service and a UPnP control point that uses the service.

When connected to a network, the UPnP service publishes the content of the service on the network, and is required to always receive processing from the UPnP control point. Technology referred to as a UPnP Low Power Device is known, in which the UPnP service is put to sleep when not used.

Also, a configuration is known in which, in consideration of the fact that the UPnP control point cannot discover a UPnP service that is already sleeping, a description of the UPnP service is transmitted by proxy (see Japanese Patent Laid-Open No. 2006-260425).

However, in the conventional technology, because the UPnP service is connected over the network, there is the problem that the UPnP service is discovered from nodes other than the UPnP control point. Moreover, because the UPnP service receives and executes an activation message that releases the sleep state from any UPnP control point, this technology is not secure.

SUMMARY OF THE INVENTION

The present invention was made in view of the above problems, and aims to provide technology whereby security is increased when providing a service.

According to one aspect of the present invention, an information processing apparatus that provides a proxy for a service that a service providing apparatus provides to a control apparatus, the information processing apparatus includes: a first communications unit adapted to connect to a first communications path; a second communications unit adapted to connect to a second communications path; a first determination unit adapted to determine whether or not the providing apparatus exists via the first communications unit; a second determination unit adapted to determine whether or not the providing apparatus exists via the second communications unit; a connection unit adapted to connect to the providing apparatus via the second communications unit; and a proxy unit adapted to connect to the control apparatus via the first communications unit, and provide a proxy for a service between the providing apparatus and the control apparatus.

According to another aspect of the present invention, a providing apparatus that provides a service to a control apparatus, the providing apparatus includes: a first communications unit adapted to connect to a first communications path; a second communications unit adapted to connect to a second communications path; and a switching unit adapted to, when a proxy function has been published via the first communications path from an information processing apparatus that provides a proxy for a service, switch providing of a service to the control apparatus via the first communications path to providing of a service to the information processing apparatus via the second communications path.

According to still another aspect of the present invention, an information processing system having a control apparatus, a providing apparatus that provides a service to the control apparatus, and an information processing apparatus that provides a proxy for the service, the information processing apparatus includes: a first communications unit adapted to connect to a first communications path; a second communications unit adapted to connect to a second communications path; a first determination unit adapted to determine whether or not the providing apparatus exists via the first communications unit; a second determination unit adapted to determine whether or not the providing apparatus exists via the second communications unit; a connection unit adapted to connect to the providing apparatus via the second communications unit; and a proxy unit adapted to connect to the control apparatus via the first communications unit, and provide a proxy for a service between the providing apparatus and the control apparatus.

According to yet another aspect of the present invention, a method for controlling an information processing apparatus that provides a proxy for a service that a service providing apparatus provides to a control apparatus, the method includes: a first determination step of determining whether or not the providing apparatus exists via a first communications unit for connecting to a first communications path; a second determination step of determining whether or not the providing apparatus exists via a second communications unit for connecting to a second communications path; a connection step of connecting to the providing apparatus via the second communications unit; and a proxy step of connecting to the control apparatus via the first communications unit, and providing a proxy for a service between the providing apparatus and the control apparatus.

According to still yet another aspect of the present invention, a method for controlling a providing apparatus that provides a service to a control apparatus, the method includes: a switching step of, when a proxy function has been published via a first communications path from an information processing apparatus that provides a proxy for a service, switching providing of a service to the control apparatus via the first communications path to providing of a service to the information processing apparatus via a second communications path.

Further features of the present invention will become apparent from the following description of exemplary embodiments (with reference to the attached drawings).

BRIEF DESCRIPTION OF THE DRAWINGS

FIGS. 7A, 7B, 7C, and 7D show example entries in a UUID storage unit 409.

FIG. 8 is a flowchart that shows the flow of processing to start a proxy service in the UPnP service providing apparatus 102.

DESCRIPTION OF THE EMBODIMENTS

Following is a detailed description of embodiments of the present invention with reference to the attached drawings. However, the constituent elements described in these embodiments are to be considered in all respects as illustrative and not limiting of the scope of the invention. Not all combinations of features described in these embodiments are essential to achieving the aims of the invention.

First Embodiment
(Network Configuration)

Figure 1:
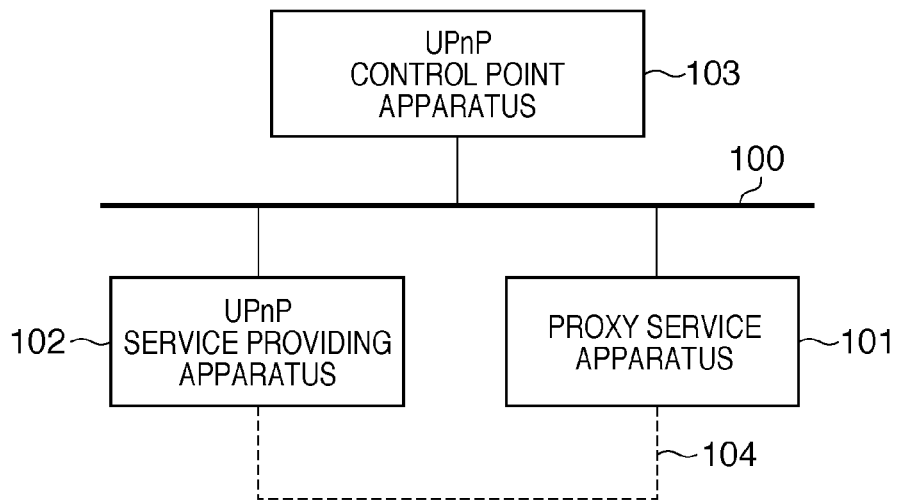
FIG. 1 shows the configuration of a network system.

A first embodiment of the present invention will be described with reference to the attached drawings. FIG. 1 shows the network configuration of an information processing system (network system) according to the present embodiment.

A LAN 100 is a network that serves as an information transmission path, and is a LAN (Local Area Network) that is used as a first communications path. The LAN 100 is not limited to being a LAN, and may also be a WAN (Wide Area Network) or a combination of a LAN and a WAN. In the present embodiment, a wireless LAN is used as the LAN 100, but this is not a limitation. For example, an ad-hoc network, a wired LAN, Bluetooth (registered trademark), Zigbee, UWB, or the like may also be used.

A proxy service apparatus 101 is an information processing apparatus that has a proxy function of providing a proxy for (relaying) a UPnP service connected to the LAN 100. In the present embodiment, an example is described in which the service is a UPnP service, but of course this description is likewise applicable to a service whereby remote operation is performed, or a combination of those services.

A UPnP service providing apparatus 102 is an apparatus that is connected to the LAN 100 and has a function of providing a UPnP service. A UPnP control point apparatus 103 is a control apparatus that is connected to the LAN 100, and has a function of receiving and operating a UPnP service.

A Bluetooth network 104 is a network with a Bluetooth connection between the proxy service apparatus 101 and the UPnP service providing apparatus 102, and functions as a second communications path in the present embodiment. Bluetooth is used in the Bluetooth network 104, but this is not a limitation; for example, the network 104 may also be configured using an ad-hoc network, a wired LAN, a wireless LAN, ZigBee network, or UWB.

In the present embodiment, different communications units are used in the LAN 100 and the Bluetooth network 104, but this is not a limitation. That is, a configuration may also be adopted in which the LAN 100 and the Bluetooth network 104 employ the same communications unit but different parameters, modes, or the like.

In the present embodiment, a UPnP service that was directly provided from the UPnP service providing apparatus 102 to the UPnP control point apparatus 103 via the LAN 100 is switched so as to be provided via the Bluetooth network 104 and the proxy service apparatus 101. Thus, it is possible to eliminate unauthorized operation (such as waking from sleep) of the UPnP service providing apparatus 102 from a malicious apparatus connected to the LAN 100.

(Hardware Configuration of Proxy Service Apparatus)

Figure 2:
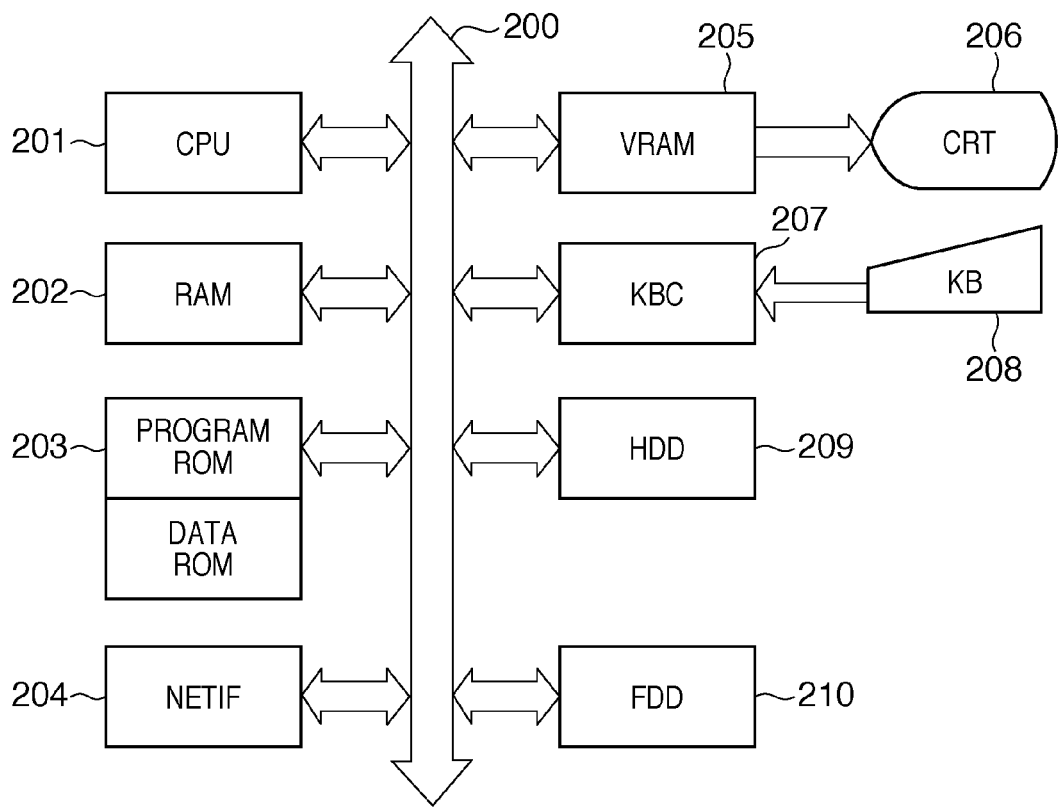
FIG. 2 shows the hardware configuration of a proxy service apparatus 101.

FIG. 2 shows the hardware configuration of the proxy service apparatus 101 according to the present embodiment. In the present embodiment, the proxy service apparatus 101 is realized with a computer system such as a PC (personal computer), a workstation, a notebook PC, or a palmtop PC. However, the proxy service apparatus 101 can also be realized by various household electronics products such as a television with a built-in computer, a game device having a communications function, or a terminal having a communications function for communications with another network control apparatus such as a portable telephone or a PHS handset, or can be realized by a combination of these devices.

Reference numeral 201 denotes a central processing apparatus (referred to below as a CPU) that is responsible for control of the computer system. Reference numeral 202 denotes a random access memory (a writable memory, referred to below as a RAM) that functions as a main memory of the CPU 201, and serves as an area for executed programs or an execution area for those programs, and also serves as a data area.

Reference numeral 203 denotes a read-only memory (referred to below as a ROM) where operational processing procedures of the CPU 201 are recorded. The ROM 203 includes a program ROM, where basic software (OS), which is a system program that executes device control of the computer system, is recorded, and a data ROM, where information necessary for operating the system and the like is recorded. An HDD 209 described below may be used instead of the RAM 202 and the ROM 203. Various operations described below are executed by the CPU 201 executing a program stored on a computer-readable recording medium such as the ROM 203.

Reference numeral 204 denotes a network interface (referred to below as a NETIF). The NETIF 204 performs control for transmitting data between computer systems via the network, and performs diagnosis of connection status. The NETIF functions as a first communications unit for connecting to the LAN 100 (the first communications path), and as a second communications unit for connecting to the Bluetooth network (the second communications path).

Reference numeral 205 denotes a video RAM (referred to below as a VRAM) that opens an image displayed in a screen of a CRT 206 described below that shows the operating status of the computer system, and controls that display. Reference numeral 206 denotes a display apparatus that displays processing results and the like of the computer system, and for example, is a display such as a CRT (cathode ray tube) display or a liquid crystal panel display. Below, this display is referred to as a CRT.

Reference numeral 207 denotes a controller that controls input signals from an external input apparatus 208. Below, this controller is referred to as a KBC (keyboard controller). Reference numeral 208 denotes an external input apparatus for receiving operation of the computer system by a user of the computer system, and for example, is a keyboard or the like. Below, this external input apparatus is referred to as a KB.

Reference numeral 209 denotes a storage apparatus that, for example, is a hard disk or the like. This storage apparatus is used for storing data such as application programs and image information. Below, this storage apparatus is referred to as an HDD 209. Reference numeral 210 denotes an external input/output apparatus that performs input/output for a removable drive, for example such as a flexible disk drive (FDD) or a CD-ROM drive, and is used for performing reading out and so forth from the medium of the above application programs. Below, this external input/output apparatus is referred to as an FDD. Application programs or data stored in the HDD 209 can also be used by being stored in the FDD 210. Reference numeral 200 denotes an input/output bus (address bus, data bus, and control bus) for connecting between the units described above.

(UPnP Service Providing Apparatus)

Figure 3:
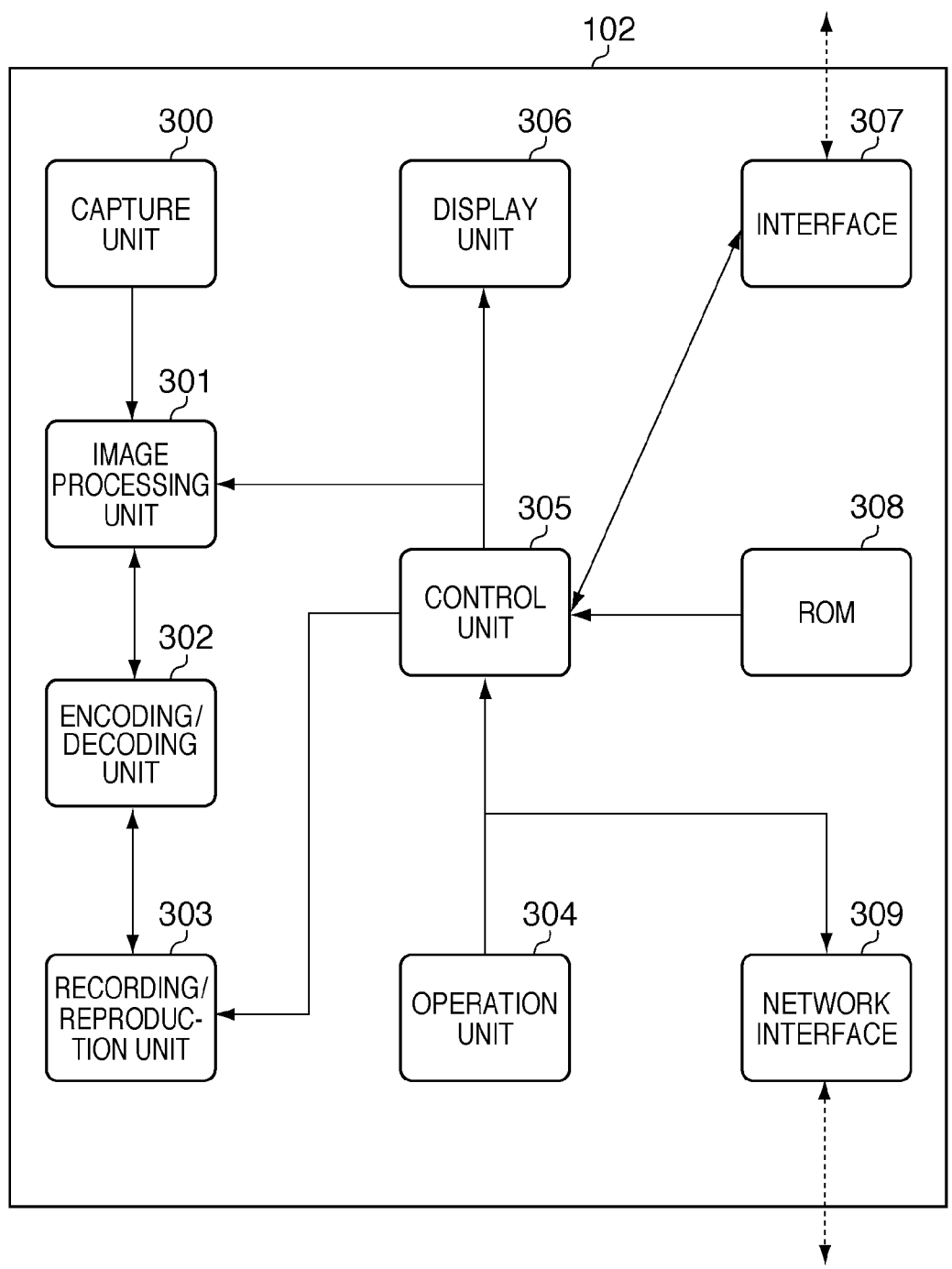
FIG. 3 shows the configuration of a UPnP service providing apparatus 102.

In the present embodiment, the UPnP service providing apparatus 102 is described as a digital camera. FIG. 3 shows the configuration of the UPnP service providing apparatus 102. The UPnP service providing apparatus 102 is not limited to being a digital camera, and can be realized as any sort of terminal having a communications function for communicating with a network control apparatus. For example, the UPnP service providing apparatus 102 can be realized with a PC, a workstation, a notebook PC, a palmtop PC, various household electronics products such as a television with a built-in computer, a game device having a communications function, a portable telephone, a PHS handset, or a combination of these devices.

In the UPnP service providing apparatus 102, reference numeral 300 denotes a capture unit that captures an optical image of a subject. Reference numeral 301 denotes an image processing unit that converts a captured image that has been output from the capture unit 300 to image data of a predetermined format, and adds transparency data to the image data.

Reference numeral 302 denotes an encoding/decoding unit that performs predetermined high-efficiency encoding (for example, variable length encoding after DCT conversion and quantization) of image data that has been output from the image processing unit 301. The encoding/decoding unit 302 also performs decompression and decoding of reproduced compressed image data from a recording/reproduction unit 303, and supplies that image data to the image processing unit 301.

Reference numeral 303 denotes a recording/reproduction unit that records and/or reproduces compressed and encoded image data to/from an unshown recording medium, and reference numeral 304 denotes an operation unit that instructs processing operations in the UPnP service providing apparatus 102. Reference numeral 305 denotes a control unit that controls operation of the respective processing units that constitute the UPnP service providing apparatus 102. The control unit 305 is provided with a microcomputer and a memory where predetermined program code can be stored, and performs processing and various operations described below related to the UPnP service.

Reference numeral 306 denotes a display unit that uses an EVF (electronic viewfinder), a liquid crystal panel, or the like to display an image that has been captured by the capture unit 300. Reference numeral 307 denotes an interface via which image data captured by the capture unit 300 is communicated.

Reference numeral 308 denotes a ROM where information related to the functionality of the UPnP service providing apparatus 102 is stored. The UPnP service providing apparatus 102 in the present embodiment, for example, performs compression/encoding using JPEG (Joint Photographic Experts Group) format as technology for encoding image data.

Reference numeral 309 denotes a network interface (NETIF). The NETIF 309 performs control for transmitting data to/from the information processing apparatus via the network, and performs diagnosis of connection status.

(Module Configuration of Proxy Service Apparatus)

Figure 4A:
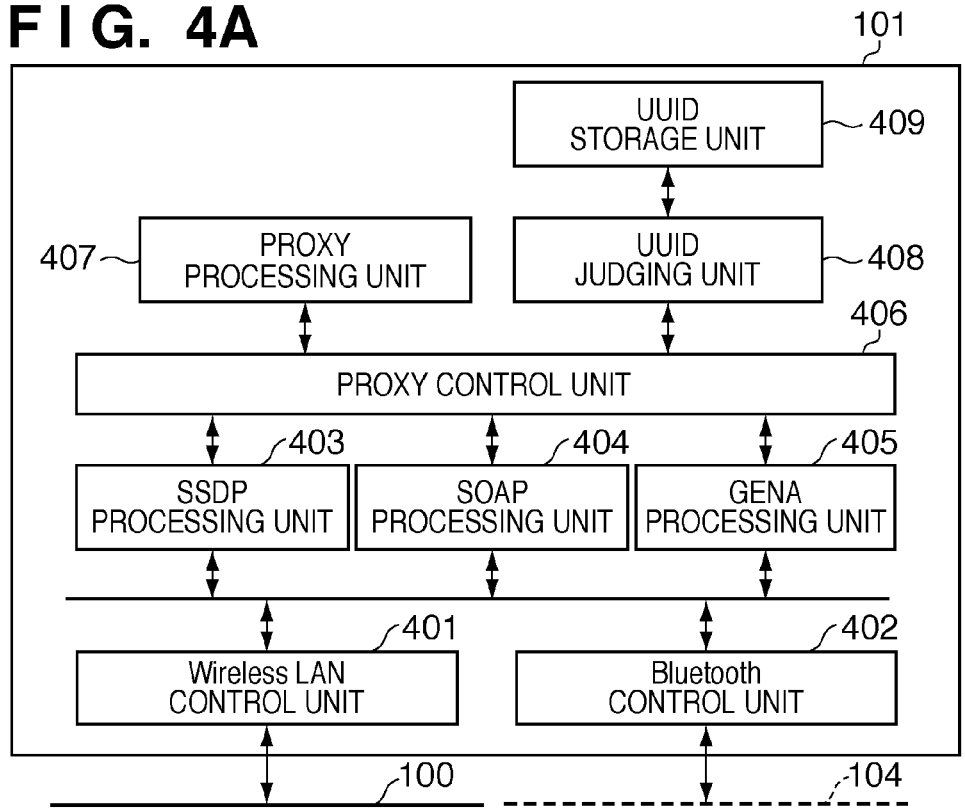
FIGS. 4A and 4B show the module configuration of the proxy service apparatus 101.

FIG. 4A shows the module configuration of the proxy service apparatus 101 of the present embodiment. Reference numeral 401 denotes a wireless LAN control unit that serves as a first communications unit, is connected to the LAN 100, and performs wireless LAN communications processing and TCP/IP communications processing. Reference numeral 402 denotes a Bluetooth control unit that serves as a second communications unit, is connected to the Bluetooth network 104, and performs Bluetooth communications processing and TCP/IP communications processing.

Reference numeral 403 denotes an SSDP processing unit that receives corresponding packets from the wireless LAN control unit 401 and the Bluetooth control unit 402, and performs SSDP processing. Here, SSDP is an abbreviation of Simple Service Discovery Protocol, and is a protocol whereby a UPnP device on a network is searched for/discovered. The SSDP processing unit 403 uses SSDP to discover a service, respond to discovery of the service, advertise the service, and so forth. In the present embodiment, SSDP is used, but this is not a limitation; the invention can also be realized using another technique, such as a WS-Discovery web service.

Reference numeral 404 denotes a SOAP processing unit that receives corresponding packets from the wireless LAN control unit 401 and the Bluetooth control unit 402, and performs SOAP processing. Here, SOAP is an abbreviation of Simple Object Access Protocol, and is a protocol for exchanging messages (objects) between pieces of software. The SOAP processing unit 404 uses SOAP to execute services, receive services, and so forth. In the present embodiment, SOAP is used, but this is not a limitation; the invention can also be realized using another technique whereby a remote object is executed, such as a remote procedure call (RPC).

Reference numeral 405 denotes a GENA processing unit that receives corresponding packets from the wireless LAN control unit 401 and the Bluetooth control unit 402, and performs GENA processing. Here, GENA is an abbreviation of General Event Notification Architecture, and is a protocol for performing control of event information. GENA is used to perform event notification, event subscription, and so forth. In the present embodiment, GENA is used, but this is not a limitation; the invention can also be realized using another technique, such as WS-Eventing or WS-Notification.

Reference numeral 406 denotes a proxy control unit. The proxy control unit 406 manages the SSDP processing unit 403, the SOAP processing unit 404, and the GENA processing unit 405, and judges whether to provide a proxy for a service.

Reference numeral 407 denotes a proxy processing unit that creates a message for providing a proxy for a discovered service, and so forth. In the present embodiment, the proxy processing unit 407 provides a proxy for UPnP processing, but this is not a limitation; a proxy may be provided for a combination of the various functions described up to this point. In the present embodiment a proxy method is adopted in which after once receiving all UPnP services, the proxy processing unit 407 again transmits a service, but this is not a limitation; a proxy may be provided by rewriting a message (rewriting an IP address or the like). Also, the proxy processing unit 407 may hold a cache related to information regarding services of the UPnP service providing apparatus 102.

Reference numeral 408 denotes a UUID judging unit that judges whether or not a UUID of a service discovered via the wireless LAN control unit matches the UUID of a service discovered via the Bluetooth control unit. UUID is an abbreviation of Universal Unique Identifier. In the present embodiment, a configuration is described in which a proxy is provided for a UPnP service, so the UUID judging unit 408 judges a UUID, but this is not a limitation; another unique identifier may be judged.

Reference numeral 409 denotes a UUID storage unit. The UUID storage unit 409 manages the UUIDs of services discovered via the wireless LAN control unit and the UUIDs of services discovered via the Bluetooth control unit.

(Module Configuration of UPnP Service Providing Apparatus)

Figure 5A:
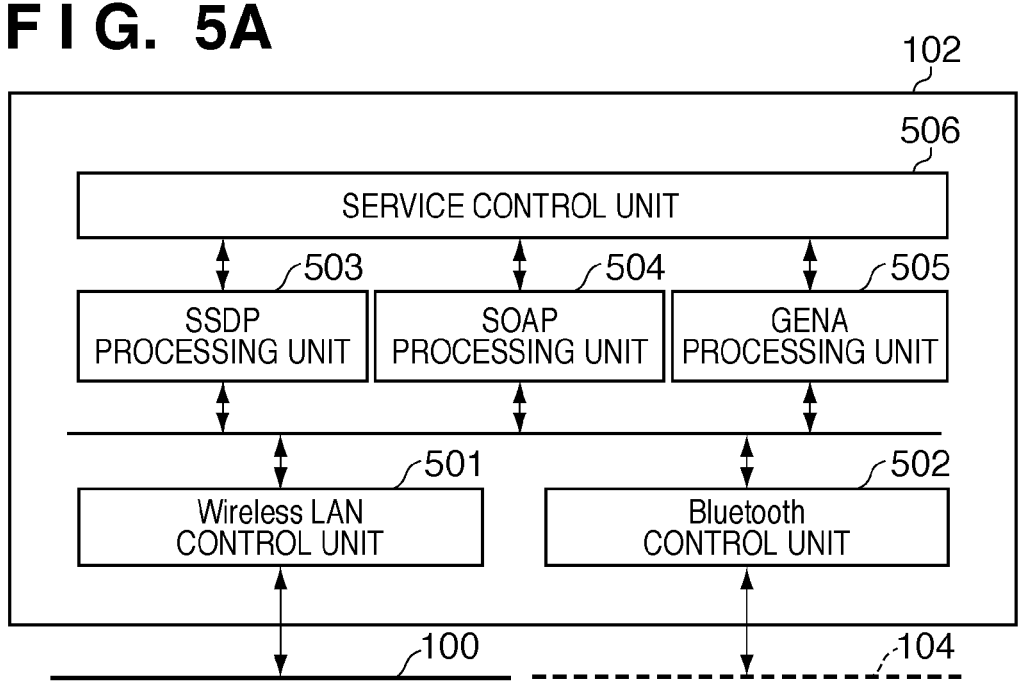
FIGS. 5A and 5B show the module configuration of the UPnP service providing apparatus 102.

FIG. 5A shows the module configuration of the UPnP service providing apparatus 102 of the present embodiment. Reference numeral 501 denotes a wireless LAN control unit that is connected to the LAN 100, and performs wireless LAN communications processing and TCP/IP communications processing. Reference numeral 502 denotes a Bluetooth control unit that is connected to the Bluetooth network 104, and performs Bluetooth communications processing and TCP/IP communications processing.

Reference numeral 503 denotes an SSDP processing unit that receives corresponding packets from the wireless LAN control unit 501 and the Bluetooth control unit 502, and performs SSDP processing. The SSDP processing unit 503 uses SSDP to discover a service, respond to discovery of the service, advertise the service, and so forth. In the present embodiment, SSDP is used, but this is not a limitation; the invention can also be realized using another technique, such as WS-Discovery.

Reference numeral 504 denotes a SOAP processing unit that receives corresponding packets from the wireless LAN control unit 501 and the Bluetooth control unit 502, and performs SOAP processing. The SOAP processing unit 504 uses SOAP to execute services, receive services, and so forth. In the present embodiment, SOAP is used, but this is not a limitation; the invention can also be realized using another technique whereby a remote object is executed, such as a remote procedure call.

Reference numeral 505 denotes a GENA processing unit that receives corresponding packets from the wireless LAN control unit 501 and the Bluetooth control unit 502, and performs GENA processing. The GENA processing unit 505 uses GENA to perform event notification, event subscription, and so forth. In the present embodiment, GENA is used, but this is not a limitation; the invention can also be realized using another technique, such as WS-Eventing or WS-Notification.

Reference numeral 506 denotes a service control unit. The service control unit 506 manages the SSDP processing unit 503, the SOAP processing unit 504, and the GENA processing unit 505, and performs UPnP processing.

(Processing to Start Providing Service in Proxy Service Apparatus)

Figure 6:
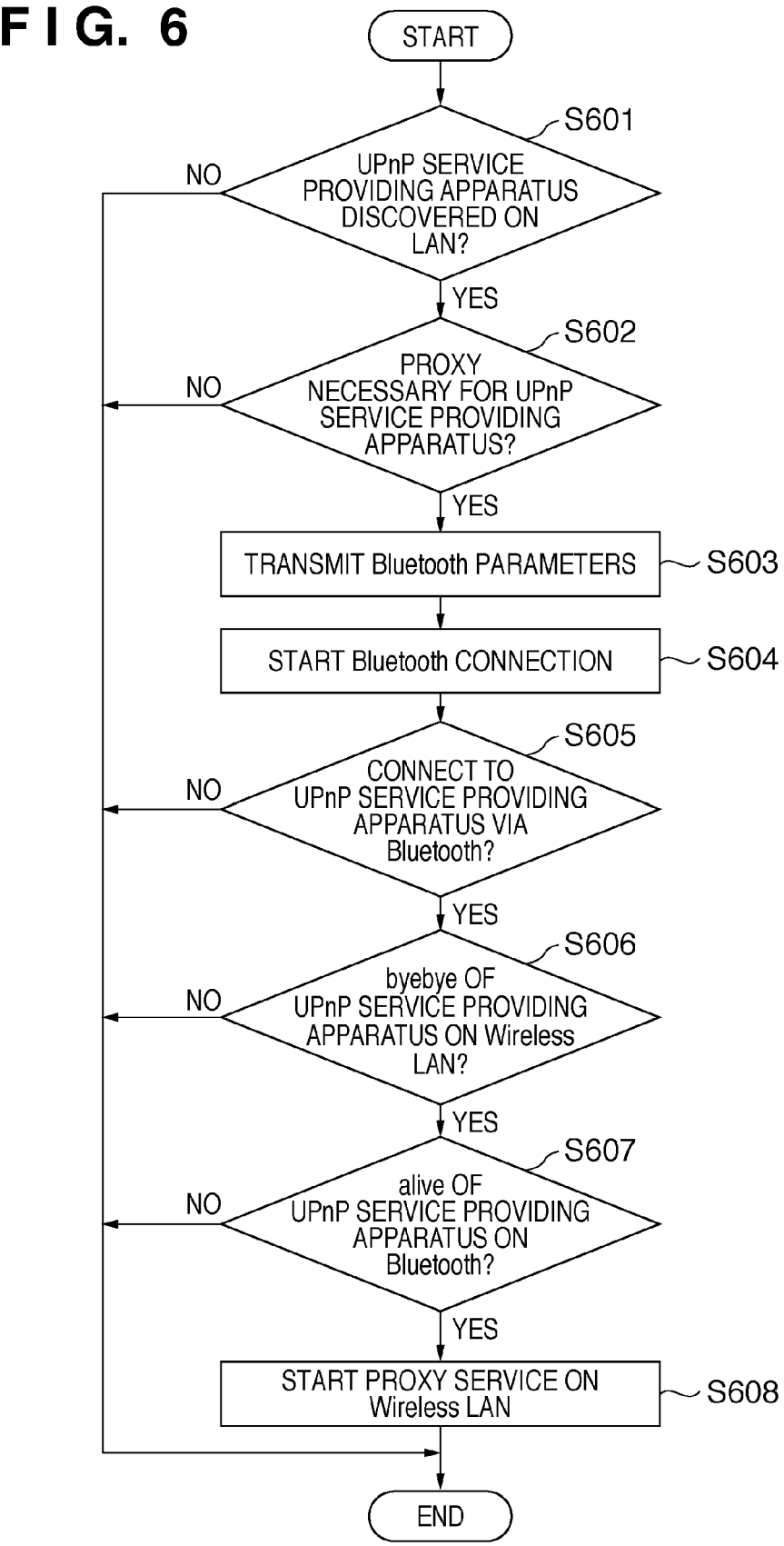
FIG. 6 is a flowchart that shows the flow of processing to start a proxy service in the proxy service apparatus 101.

FIG. 6 is a flowchart that shows the flow of processing to start a proxy service in the proxy service apparatus 101. The proxy service apparatus 101 and the UPnP service providing apparatus are connected to only the LAN 100.

In Step S601, the proxy control unit 406 decides to search for a UPnP service providing apparatus 102. The proxy control unit 406 makes a request to the SSDP processing unit 403 to search for a UPnP service providing apparatus 102 on the LAN 100. The SSDP processing unit 403 transmits an SSDP m-search message to search for a UPnP service providing apparatus 102 on the LAN 100 via the wireless LAN control unit 401. When the SSDP m-search message is received, the UPnP service providing apparatus 102 responds with an SSDP response message to the proxy service apparatus 101. The SSDP processing unit 403 receives the SSDP response message from the UPnP service providing apparatus 102 via the wireless LAN control unit 401. Thus, the SSDP processing unit 403 is able to discover a UPnP service providing apparatus 102. The SSDP processing unit 403 transmits the results of the search for a UPnP service providing apparatus 102 to the proxy control unit 406. When the proxy control unit 406 judges from the results of the search for a UPnP service providing apparatus 102 that a UPnP service providing apparatus 102 was discovered (YES in Step S601), the proxy control unit 406 saves the UUID of the UPnP service providing apparatus 102 in the UUID storage unit 409, and processing proceeds to Step S602. When the proxy control unit 406 judges from the results of the search for a UPnP service providing apparatus 102 that a UPnP service providing apparatus 102 has not been discovered (NO in Step S601), processing ends. The SSDP processing unit 403 may also discover a UPnP service providing apparatus 102 by receiving an SSDP alive message from the UPnP service providing apparatus 102.

In Step S602, the proxy control unit 406 makes a request to the SOAP processing unit 404 to transmit a confirmation message confirming whether or not a UPnP service proxy is necessary to the UPnP service providing apparatus 102. The SOAP processing unit 404 transmits the confirmation message to the UPnP service providing apparatus 102 on the LAN 100 via the wireless LAN control unit 401. The UPnP service providing apparatus 102 judges whether or not a proxy is necessary, and sends a response with the result of that judgment. The SOAP processing unit 404 receives the result from the UPnP service providing apparatus 102, and transmits the result to the proxy control unit 406. Based on the result, the proxy control unit 406 judges whether or not a proxy is necessary for the UPnP service providing apparatus 102. When the proxy control unit 406 judges that a proxy is necessary for the UPnP service providing apparatus 102 (YES in Step S602), processing proceeds to Step S603. When the proxy control unit 406 judges that a proxy is not necessary for the UPnP service providing apparatus 102 (NO in Step S602), processing ends.

In Step S603, the proxy control unit 406 transmits parameters for connecting to the Bluetooth network 104 to the SOAP processing unit 404. The SOAP processing unit 404 transmits the parameters to the UPnP service providing apparatus 102 via the wireless LAN control unit 401, and processing proceeds to Step S604.

In Step S604, the proxy control unit 406 performs processing to start a connection to the Bluetooth network 104 using the Bluetooth control unit 402. Then, processing proceeds to Step S605.

In Step S605, the proxy control unit 406 judges whether or not a connection with the UPnP service providing apparatus 102 has been established via the Bluetooth control unit 402. When the proxy control unit 406 judges that a connection has been established (YES in Step S605), processing proceeds to Step S606. When the proxy control unit 406 judges that a connection has not been established (NO in Step S605), processing ends.

When a connection via Bluetooth is established, the UPnP service providing apparatus 102 transmits a byebye message indicating to end communications for a connection via the wireless LAN (indicating to disconnect from the LAN 100). Therefore, in Step S606, the proxy control unit 406 of the proxy service apparatus 101 judges the SSDP byebye message received by the SSDP processing unit 403 from the LAN 100 via the wireless LAN control unit 401. The proxy control unit 406 judges whether or not an SSDP byebye message matching the UUID of the UPnP service providing apparatus 102 stored in the UUID storage unit 409 was received. When the proxy control unit 406 judges that the received byebye message is a byebye message of the UPnP service providing apparatus 102 (YES in Step S606), processing proceeds to Step S607. When the proxy control unit 406 judges that the received byebye message is not a byebye message of the UPnP service providing apparatus 102 (NO in Step S606), processing ends. Next is a description of a case in which a byebye message has been received before the proxy control unit 406 executes processing. In this case, because the SSDP processing unit 403 manages SSDP alive/byebye of the UPnP service providing apparatus 102, it is possible to judge that a byebye message has been received.

In Step S607, the proxy control unit 406 makes a request to the SSDP processing unit 403 to search for a UPnP service providing apparatus 102 on the Bluetooth network 104. The SSDP processing unit 403 uses an SSDP m-search message to search for a UPnP service providing apparatus 102 via the Bluetooth control unit 402. The SSDP processing unit 403 transmits the search results to the proxy control unit 406. The proxy control unit 406 uses the UUID judging unit 408 to judge whether or not there is a UUID that matches a UUID stored in the UUID storage unit 409. When judged that there is a matching UUID, the proxy control unit 406 judges that a UPnP service providing apparatus 102 has been discovered. When the proxy control unit 406 judges that a UPnP service providing apparatus 102 has been discovered (YES in Step S607), processing proceeds to Step S608. When the proxy control unit 406 judges that a UPnP service providing apparatus 102 has not been discovered (NO in Step S607), processing ends. A UPnP service providing apparatus 102 may also be discovered by the SSDP processing unit 403 receiving an SSDP alive message from the UPnP service providing apparatus 102. Also, a UPnP service providing apparatus 102 may be discovered by the proxy control unit 406 causing the SSDP processing unit 403 to execute an SSDP m-search using a UUID stored in the UUID storage unit 409 as a key.

In Step S608, the proxy control unit 406 makes a request to the proxy processing unit 407 for a UPnP service proxy for the UPnP service providing apparatus 102, and then processing ends. The proxy processing unit 407 uses the SSDP processing unit 403, the SOAP processing unit 404, and the GENA processing unit 405 to provide a UPnP service proxy only in cases where the UUID stored in the UUID storage unit 409 has 'yes' entered regarding whether to provide a proxy.

Here, the same UUID as the UUID of the UPnP service providing apparatus is used. The proxy processing unit 407 performs processing as a UPnP control point on the Bluetooth network 104 side, and performs processing as a UPnP service on the LAN 100 side.

FIG. 6 illustrates a case in which the same UUID is used when performing UPnP service proxy processing, but this is not a limitation. For example, different UUIDs can be used when mapping is used in the proxy service apparatus 101.

FIG. 7A shows example entries in the UUID storage unit 409 in Step S601 in FIG. 6. In FIG. 7A, reference numeral 701 denotes a UUID for an apparatus or a service, and reference numeral 702 denotes a network to which the corresponding apparatus or service is currently connected. Reference numeral 703 denotes the status of the apparatus or service that is identified by the UUID 701, and reference numeral 704 is information related to whether or not to provide a proxy service. In the example in FIG. 7A, uuid:98765432-1234-abcd-1234-000011112222 corresponds to a UPnP device that has been connected to the LAN 100, and a proxy service will not be provided. uuid:816c5df0-c2ed-11da-9216-0008741e9395 corresponds to a UPnP service providing apparatus 102, and whether or not to provide a proxy service is unknown.

FIG. 7B shows an example entry in the UUID storage unit 409 when a proxy is necessary, in Step S602 in FIG. 6. In this entry, yes is indicated in the proxy service item for the uuid:816c5df0-c2ed-11da-9216-0008741e9395 corresponding to the UPnP service providing apparatus 102, and so a proxy service will be provided.

FIG. 7C shows an example entry in the UUID storage unit 409 when a byebye message for the UPnP service providing apparatus 102 has been received, in Step S606 in FIG. 6. In this entry, byebye is indicated in the item 703 regarding the status of the uuid:816c5df0-c2ed-11da-9216-0008741e9395 corresponding to the UPnP service providing apparatus 102, and so the apparatus has been disconnected from the LAN 100.

FIG. 7D shows an example entry in the UUID storage unit 409 when an alive message for the UPnP service providing apparatus 102 has been received, in Step S607 in FIG. 6. The uuid:816c5df0-c2ed-11da-9216-0008741e9395 corresponding to the UPnP service providing apparatus 102 has been discovered on the Bluetooth network 104, and added to the entries (1001).

Thus, by managing entries, it is understood that the UPnP service providing apparatus 102 connected to the LAN 100 is the same as the UPnP service providing apparatus 102 connected to the Bluetooth network 104. An entry in which a byebye state is indicated may be deleted after a fixed period of time.

(Processing to Start Providing Service in UPnP Service Providing Apparatus)

Next is a description of processing to start providing service in the UPnP service providing apparatus 102, with reference to FIG. 8. FIG. 8 is a flowchart that shows the flow of processing to start providing service in the UPnP service providing apparatus 102.

In Step S1101, the service control unit 506 uses the SOAP processing unit 504 to receive a proposed UPnP service proxy from the proxy service apparatus 101 via the wireless LAN control unit 501. The proposed UPnP service proxy is the proxy transmitted in Step S602 in the proxy service apparatus 101. When the service control unit 506 has judged to make a request to the proxy service apparatus 101 for a UPnP service proxy (YES in Step S1101), processing proceeds to Step S1102. When the service control unit 506 has judged to not make a request to the proxy service apparatus 101 for a UPnP service proxy (NO in Step S1101), processing ends.

In Step S1102, the service control unit 506 uses the SOAP processing unit 504 to receive parameters of the Bluetooth network 104 from the proxy service apparatus 101 via the wireless LAN control unit. The service control unit 506 saves the parameters of the Bluetooth network 104 in a storage area, and processing proceeds to Step S1103. The parameters of the Bluetooth network 104 are the parameters that were transmitted by the proxy service apparatus 101 in Step S603 in FIG. 6.

In Step S1103, the service control unit 506 uses the Bluetooth control unit 502 to start a connection to the Bluetooth network 104. Then, processing proceeds to Step S1104.

In Step S1104, the service control unit 506 uses the Bluetooth control unit 502 to confirm whether or not the UPnP service providing apparatus 102 has been connected to the proxy service apparatus 101 via the Bluetooth network 104. When the service control unit 506 judges that the UPnP service providing apparatus 102 has been connected to the proxy service apparatus 101 via the Bluetooth network 104 (YES in Step S1104), processing proceeds to Step S1105. When the service control unit 506 judges that the UPnP service providing apparatus 102 is not connected to the proxy service apparatus 101 via the Bluetooth network 104 (NO in Step S1104), processing ends.

In Step S1105, the service control unit 506 makes a request to the SSDP processing unit 503, the SOAP processing unit 504, and the GENA processing unit 505 to stop functionality related to the UPnP service published to the LAN 100. The SSDP processing unit 503 transmits an SSDP byebye message to the LAN 100 via the wireless LAN control unit 501. The SOAP processing unit 504 stops SOAP processing for the LAN 100 via the wireless LAN control unit 501. The GENA processing unit 505 stops GENA processing for the LAN 100 via the wireless LAN control unit 501. When the service control unit 506 judges that functionality related to the UPnP service published to the LAN 100 has stopped, processing proceeds to Step S1106.

In Step S1106, the service control unit 506 makes a request to the SSDP processing unit 503, the SOAP processing unit 504, and the GENA processing unit 505 to publish the UPnP service to the Bluetooth network 104. After receiving the request, the SSDP processing unit 503 transmits an SSDP alive message to the Bluetooth network 104 via the Bluetooth control unit 502. The SOAP processing unit 504 starts SOAP processing for the Bluetooth network 104 via the Bluetooth control unit 502. The GENA processing unit 505 starts GENA processing for the Bluetooth network 104 via the Bluetooth control unit 502. When the service control unit 506 judges that the UPnP service has activated on the Bluetooth network 104, processing proceeds to Step S1107.

In Step S1107, the service control unit 506 uses the SSDP processing unit 503 to acquire an SSDP alive message on the LAN 100 via the wireless LAN control unit 501. The service control unit 506 confirms whether a UUID included in the acquired alive message is the same as the UUID of a UPnP service providing apparatus 102. When the service control unit 506 judges that it was possible to confirm matching UUIDs within a fixed period of time (YES in Step S1107), processing proceeds to Step S1108. When the service control unit 506 judges that it was not possible to confirm matching UUIDs within a fixed period of time (NO in Step S1107), processing proceeds to Step S1109.

In Step S1108, the service control unit 506 uses the wireless LAN control unit 501 to disconnect the LAN 100. Then, processing ends.

In Step S1109, the service control unit 506 makes a request to the SSDP processing unit 503, the SOAP processing unit 504, and the GENA processing unit 505 to stop functionality related to the UPnP service published to the Bluetooth network 104. The SSDP processing unit 503 transmits an SSDP byebye message to the Bluetooth network 104 via the Bluetooth control unit 502. The SOAP processing unit 506 stops SOAP processing for the Bluetooth network 104 via the Bluetooth control unit 502. The GENA processing unit 505 stops GENA processing for the Bluetooth network 104 via the Bluetooth control unit 502. When the service control unit 506 judges that functionality related to the UPnP service published to the Bluetooth network 104 has stopped, processing proceeds to Step S1110.

In Step S1110, the service control unit 506 makes a request to the SSDP processing unit 503, the SOAP processing unit 504, and the GENA processing unit 505 to publish the UPnP service to the LAN 100. After receiving the request, the SSDP processing unit 503 transmits an SSDP alive message to the LAN 100 via the wireless LAN control unit 501. The SOAP processing unit 504 starts SOAP processing for the LAN 100 via the wireless LAN control unit 501. The GENA processing unit 505 starts GENA processing for the LAN 100 via the wireless LAN control unit 501. When the service control unit 506 judges that the UPnP service has activated on the LAN 100, processing proceeds to Step S1111.

In Step S1111, the service control unit 506 uses the Bluetooth control unit 502 to disconnect the Bluetooth network 104. Then, processing ends.

(Sequence of Processing to Start Providing Service)

Figure 12:
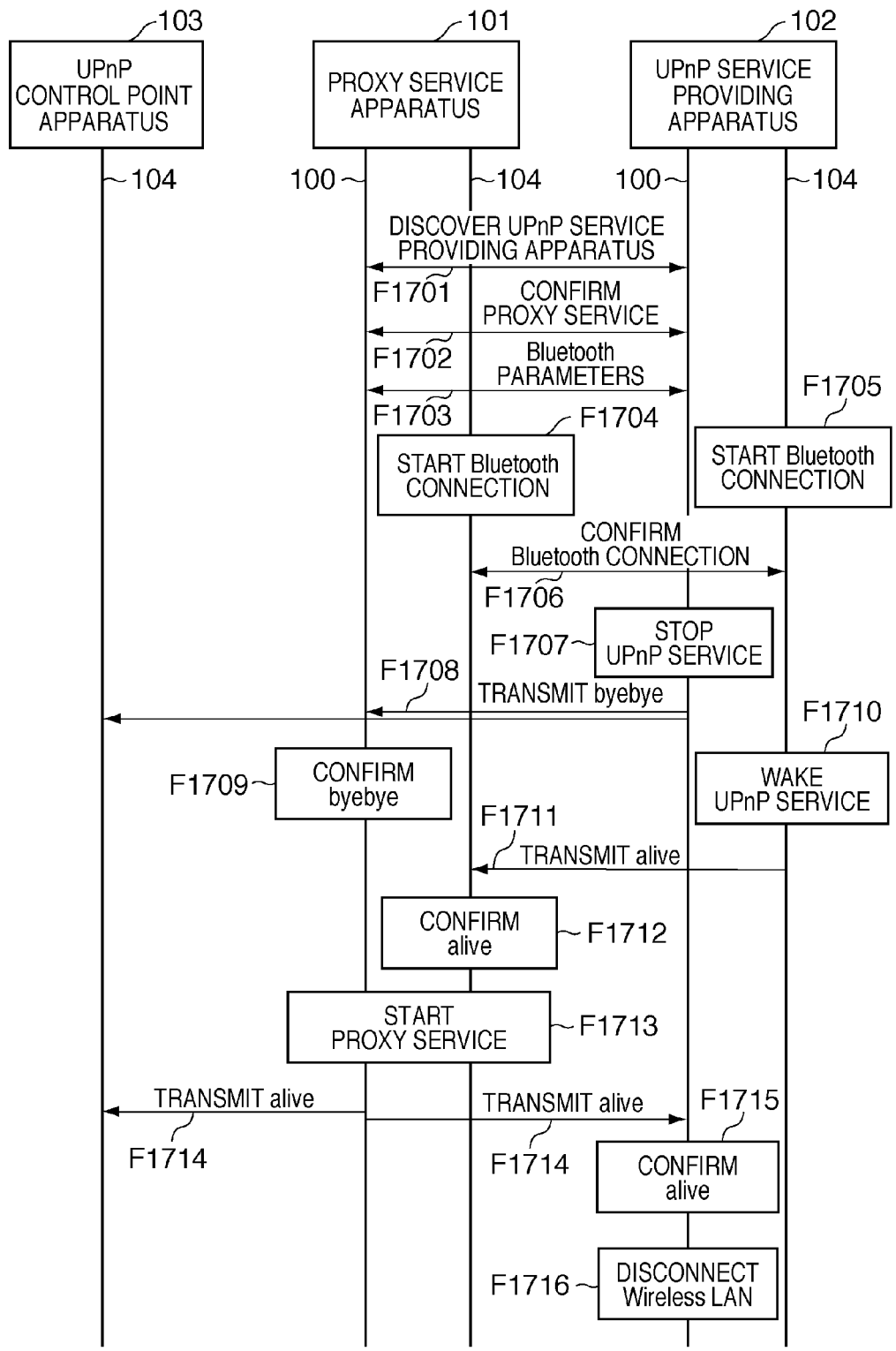
FIG. 12 is a sequence chart that shows the sequence of processing to start a proxy service.

Next is a description of the sequence of processing described with reference to the flowchart in FIGS. 6 and 8, with reference to FIG. 12. FIG. 12 is a sequence chart that shows the sequence of processing to start a proxy service in the proxy service apparatus 101 and the UPnP service providing apparatus 102 according to the first embodiment.

In F1701, the proxy service apparatus 101 discovers the UPnP service providing apparatus 102. In F1702, the proxy service apparatus 101 confirms whether or not to provide a UPnP service proxy to the UPnP service providing apparatus 102. In F1703, the proxy service apparatus 101 transmits parameters of the Bluetooth network 104 to the UPnP service providing apparatus 102.

In F1704, the proxy service apparatus 101 starts a connection to the Bluetooth network 104 according to the parameters transmitted to the UPnP service providing apparatus 102. In F1705, the UPnP service providing apparatus 102 starts a connection to the Bluetooth network 104 according to the parameters received from the proxy service apparatus 101. In F1706, the proxy service apparatus 101 and the UPnP service providing apparatus 102 confirm connection to the Bluetooth network 104.

In F1707, the UPnP service providing apparatus 102 stops UPnP service on the LAN 100. In F1708, the UPnP service providing apparatus 102 transmits an SSDP byebye message on the LAN 100.

In F1709, the proxy service apparatus 101 confirms that the byebye message received from the LAN 100 is a byebye message that includes the UUID of the UPnP service providing apparatus 102. In F1710, the UPnP service providing apparatus 102 activates a UPnP service on the Bluetooth network 104. In F1711, the UPnP service providing apparatus 102 transmits an SSDP alive message on the Bluetooth network 104.

In F1712, the proxy service apparatus 101 confirms that the alive message received from the Bluetooth network 104 is a byebye message that includes the UUID of the UPnP service providing apparatus 102. In F1713, the proxy service apparatus 101 starts a proxy service of providing a proxy for the UPnP service providing apparatus 102 on the LAN 100.

In F1714, the proxy service apparatus 101 transmits an alive message that includes the UUID of the UPnP service providing apparatus 102 on the LAN 100. In F1715, the proxy service apparatus 101 confirms that an alive message including the UUID of the UPnP service providing apparatus 102 was received on the LAN 100 by the UPnP service providing apparatus 102. In F1716, the UPnP service providing apparatus 102 disconnects from the LAN 100.

(Processing to End Service Providing in Proxy Service Apparatus)

Figures 9, 10A, 10B:
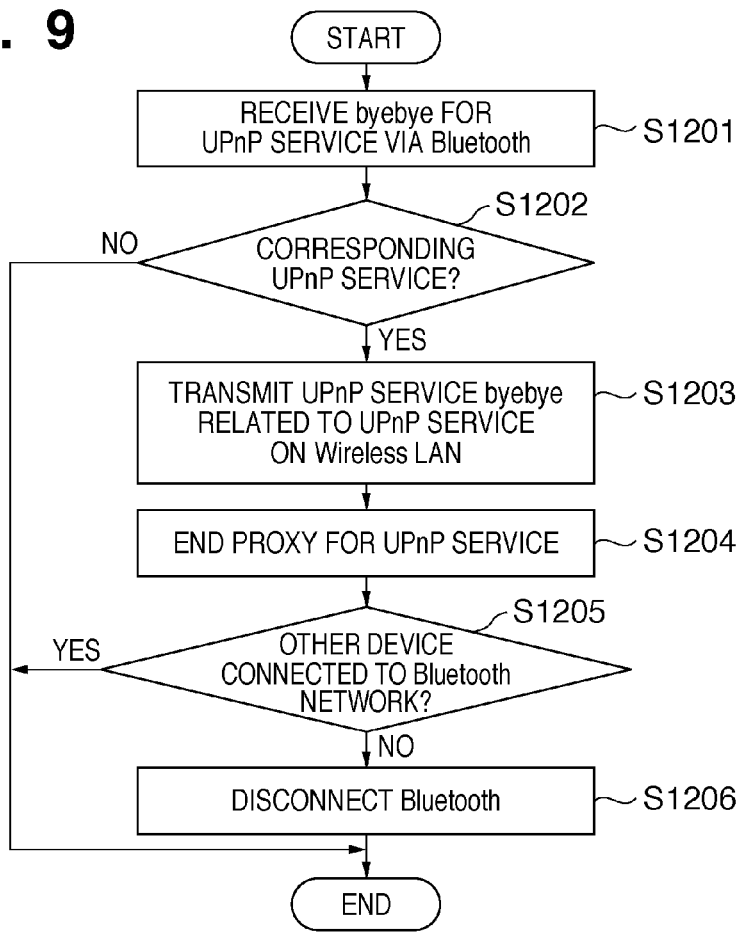
FIG. 9 is a flowchart that shows the flow of processing to end a proxy service in the proxy service apparatus 101.
FIGS. 10A and 10B show example entries in a UUID storage unit 409.

Next is a description of processing to end service providing in the proxy service apparatus 101, with reference to FIG. 9. FIG. 9 is a flowchart that shows the flow of processing to end service providing in the proxy service apparatus 101.

In Step S1201, the proxy control unit 406 uses the SSDP processing unit 403 to receive an SSDP byebye message via the Bluetooth control unit 402, and then processing proceeds to Step S1202.

In Step S1202, the proxy control unit 406 extracts the UUID from the byebye message, and transmits the extracted UUID to the UUID judging unit 408. The UUID judging unit 408 compares the received UUID with the UUIDs stored in the UUID storage unit 409 to judge whether there is a corresponding UPnP service. The UUID judging unit 408 transmits the result of judgment to the proxy control unit 406. When the proxy control unit 406 has judged that there is a UPnP service based on the received judgment result (YES in Step S1202), the entry in the UUID storage unit 409 is changed to byebye, and processing proceeds to Step S1203. When the proxy control unit 406 has judged that there is not a UPnP service based on the received judgment result (NO in Step S1202), processing ends.

In Step S1203, the proxy control unit 406 uses the SSDP processing unit 403 to transmit the SSDP byebye message via the wireless LAN control unit 401, ending the UPnP service. The UUID included in the SSDP byebye message is the same as the UUID of the UPnP service providing apparatus 102.

In Step S1204, the proxy control unit 406 instructs the proxy processing unit 407 to end the UPnP service proxy of the UPnP service providing apparatus 102, and then processing proceeds to Step S1205. The proxy control unit 406 deletes information related to the UPnP service providing apparatus 102 stored in the UUID storage unit 409.

In Step S1205, the proxy control unit 406 acquires entries from the UUID storage unit 409, and judges whether or not there is a device that is alive on the Bluetooth network 104. The proxy control unit 406 may also acquire information regarding whether there is a device connected via Bluetooth from the Bluetooth control unit 402. When the proxy control unit 406 judges that there is a device connected via Bluetooth (YES in Step S1205), processing ends. When the proxy control unit 406 judges that there is not a device connected via Bluetooth (NO in Step S1205), processing proceeds to Step S1206.

In Step S1206, the proxy control unit 406 instructs the Bluetooth control unit 402 to disconnect from the Bluetooth network 104. The Bluetooth control unit 402 performs disconnection from the Bluetooth network 104, and then processing ends.

FIG. 10A shows an example entry in the UUID storage unit 409 when a byebye message has been received from the UPnP service providing apparatus 102 in Step S1203. Byebye is indicated as the status of the uuid:816c5df0-c2ed-11da-9216-0008741e9395 corresponding to the UPnP service providing apparatus 102 (1301), and so the UPnP service providing apparatus 102 has been disconnected from the Bluetooth network 104.

FIG. 10B shows an example entry in the UUID storage unit 409 in Step S1204. Here, information related to the UPnP service providing apparatus 102 (uuid:816c5df0-c2ed-11da-9216-0008741e9395) has been deleted.

When the proxy service apparatus 101 again connects a UPnP service providing apparatus 102 to the LAN 100, the processing in FIG. 6 is started. Also, in the present embodiment, information related to the UPnP service providing apparatus 102 has been deleted, but a configuration may also be adopted in which this information is left stored in the UUID storage unit 409. In such a case, processing can of course be started from the state shown in FIG. 9.

(Processing to End Providing Service in UPnP Service Providing Apparatus)

Figure 13:
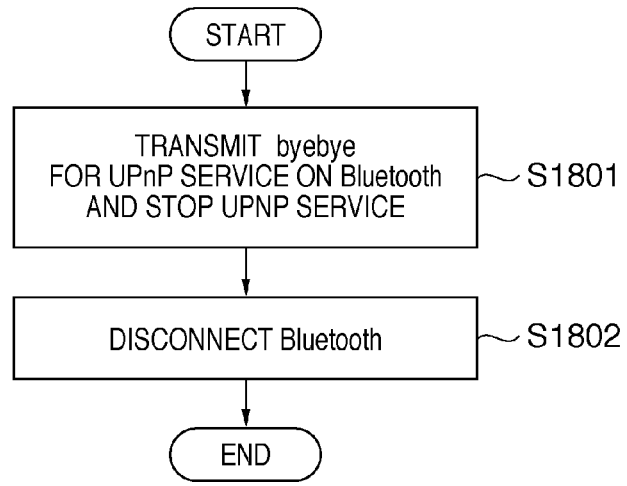
FIG. 13 is a flowchart that shows the flow of processing to end providing service in the UPnP service providing apparatus 102.

Next is a description of processing to end providing service in the UPnP service providing apparatus 102, with reference to FIG. 13. FIG. 13 is a flowchart that shows the flow of processing to end providing service in the UPnP service providing apparatus 102.

In Step S1801, the service control unit 506 uses the SSDP processing unit 503 to transmit an SSDP byebye message to the Bluetooth network 104 via the Bluetooth control unit 502. In order to stop the UPnP service, the service control unit 506 instructs the SSDP processing unit 503, the SOAP processing unit 504, and the GENA processing unit 505 to end processing, and then processing proceeds to Step S1802.

In Step S1802, the service control unit 506 instructs the Bluetooth control unit 502 to disconnect from the Bluetooth network 104. The Bluetooth control unit 502 disconnects from the Bluetooth network 104, and then processing ends.

(Sequence of Processing to End Providing Proxy Service)

Figure 14:
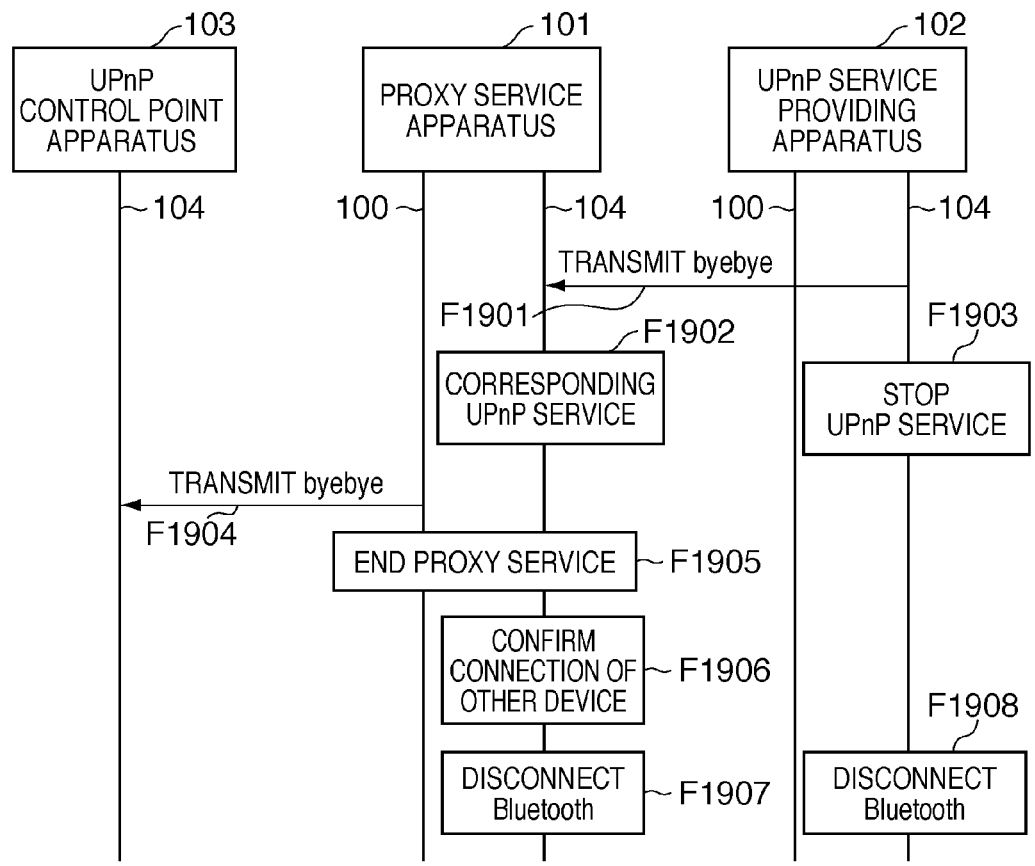
FIG. 14 is a sequence chart that shows the sequence of processing to end a proxy service.

Next, the sequence of processing described with reference to the flowcharts in FIGS. 9 and 13 will be described with reference to FIG. 14. FIG. 14 is a sequence chart that shows the sequence of processing to end a proxy service in the proxy service apparatus 101 and the UPnP service providing apparatus 102.

In F1901, the UPnP service providing apparatus 102 transmits an SSDP byebye message on the Bluetooth network 104. In F1902, the proxy service apparatus 101 judges whether or not the UUID included in the received byebye message matches the UUID of the UPnP service for which a proxy is being provided. In F1903, the UPnP service providing apparatus 102 stops the UPnP service on the Bluetooth network 104. In F1904, the proxy service apparatus 101 transmits the received byebye message including the UUID to the LAN 100.

In F1905, the proxy service apparatus 101 ends the proxy service. In F1906, the proxy service apparatus confirms that another device is not connected to the Bluetooth network 104. In F1907, the proxy service apparatus disconnects from the Bluetooth network 104. In F1908, the UPnP service providing apparatus 102 disconnects from the Bluetooth network 104.

(Ordinary UPnP Service)

Figure 11A:
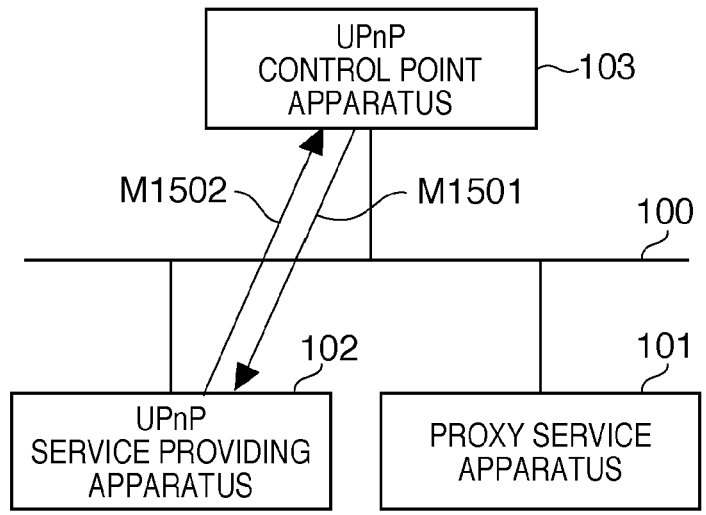
FIGS. 11A and 11B show an overview of operation when a UPnP control point apparatus 103 uses the UPnP service providing apparatus 102.

Next is a description of operation when the UPnP control point apparatus 103 directly uses the UPnP service providing apparatus 102, with reference to FIG. 11A. FIG. 11A shows an overview of operation when the UPnP control point apparatus 103 directly uses the UPnP service providing apparatus 102.

In M1501, the UPnP control point apparatus 103 can transmit UPnP SSDP, SOAP, and GENA messages to the UPnP service providing apparatus 102. In M1502, the UPnP control point apparatus 103 can receive UPnP SSDP, SOAP, and GENA messages from the UPnP service providing apparatus 102. Thus, UPnP operation is the same when the UPnP service providing apparatus 102 uses the LAN 100, and does not use the proxy service apparatus 101.

(UPnP Service Via Proxy Service Apparatus)

Figure 11B:
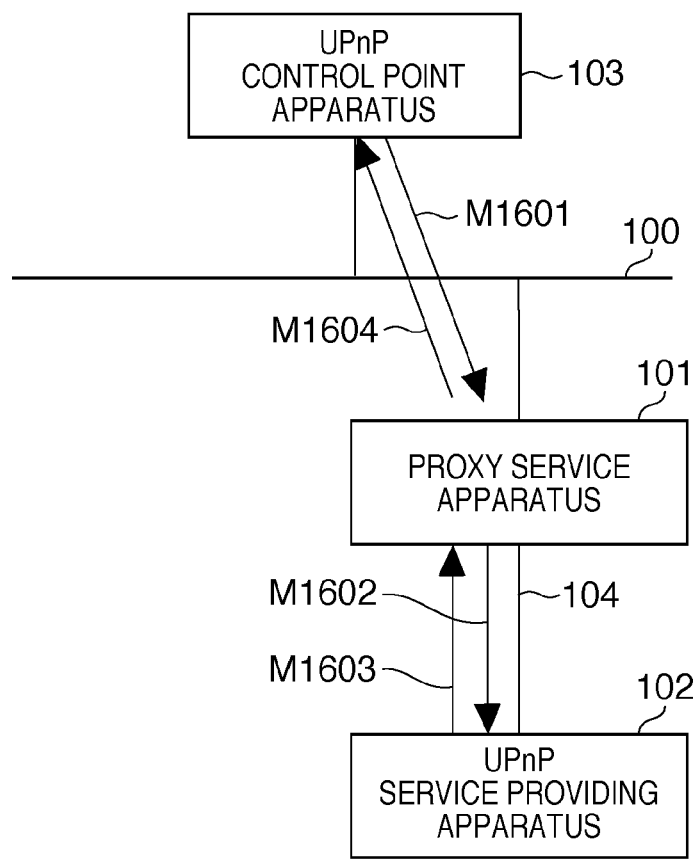

Next is a description of operation when the UPnP control point apparatus 103 uses the UPnP service providing apparatus 102 via the proxy service apparatus 101, with reference to FIG. 11B. FIG. 11B shows an overview of operation when the UPnP control point apparatus 103 uses the UPnP service providing apparatus 102 via the proxy service apparatus 101.

In M1601, the UPnP control point apparatus 103 can transmit UPnP SSDP, SOAP, and GENA messages to the proxy service apparatus 101.

In M1602, when the proxy service apparatus 101 receives various messages, the SSDP processing unit 403, the SOAP processing unit 404, and the GENA processing unit 405 perform processing, and the proxy processing unit 407 performs proxy processing. The proxy processing unit 407 uses the SSDP processing unit 403, the SOAP processing unit 404, and the GENA processing unit 405 to newly create and transmit SSDP, SOAP, and GENA messages addressed to the UPnP service providing apparatus 102.

In M1603, the proxy service apparatus 101 can receive SSDP, SOAP, and GENA messages from the UPnP service providing apparatus 102.

In M1604, when the proxy service apparatus 101 receives various messages, the SSDP processing unit 403, the SOAP processing unit 404, and the GENA processing unit 405 perform processing, and the proxy processing unit 407 performs proxy processing. The proxy processing unit 407 uses the SSDP processing unit 403, the SOAP processing unit 404, and the GENA processing unit 405 to newly create and transmit messages addressed to the UPnP control point apparatus 103.

Here, a description is given of processing performed while the proxy service apparatus 101 provides a proxy for the UPnP service providing apparatus 102. In this state, the UPnP service providing apparatus 102 is connected to the proxy service apparatus 101 via the Bluetooth network 104. In the UPnP service providing apparatus 102, when there is no access, the service control unit 506 is able to sleep using a commonly known mechanism of sleeping, such as a UPnP Low Power Device service.

Next is a description of a case when the UPnP service providing apparatus 102 has been accessed in the proxy service apparatus 101. In this case, the proxy control unit 406 can activate the UPnP service providing apparatus 102 using a commonly known mechanism of a UPnP Low Power Device control point or the like that releases a sleep state. This is not limited to a UPnP Low Power Device, and can also be realized with a combination of a WOL (Wake On LAN) and messages that advertise and operate the WOL.

Thus, when sleeping, the UPnP service providing apparatus 102 is connected to the proxy service apparatus 101 by only the Bluetooth network 104, and is isolated from the LAN 100. Therefore, access via the network from a malicious UPnP Low Power Device control point or the like that connects to the LAN 100 cannot be received, so the UPnP service providing apparatus 102 is secure. For example, the UPnP service providing apparatus 102 cannot be put to sleep or released from sleep by a malicious apparatus.

Furthermore, the proxy service apparatus 101 may restrict access as necessary when performing proxy processing. Thus, the proxy service apparatus 101 can limit types of access to the UPnP service providing apparatus 102.

As described above, the proxy service apparatus 101 of the present embodiment determines whether or not a UPnP service providing apparatus 102 exists on the LAN 100 (first determination), and when a UPnP service providing apparatus 102 exists on the LAN 100, connects to that UPnP service providing apparatus 102 via the Bluetooth network 104. Then, the proxy service apparatus 101 connects to the UPnP control point apparatus 103 via the LAN 100, and relays service between the UPnP service providing apparatus 102 and the UPnP control point apparatus 103.

Accordingly, the proxy service apparatus 101 is able to contain a UPnP service providing apparatus on the network of the Bluetooth network 104. Thus, the proxy service apparatus 101 is able to conceal the UPnP service providing apparatus 102 from the LAN 100. Therefore, the UPnP service providing apparatus 102 can only receive access for which the proxy service apparatus 101 has provided a proxy, and so the UPnP service providing apparatus 102 is secure. Moreover, as in the present embodiment, when switching from a wireless LAN to Bluetooth, power consumption can be reduced.

According to the present embodiment, it is possible for the proxy service apparatus 101 to start a service after confirming that the UPnP service providing apparatus 102 is connected to the Bluetooth network 104. When an error occurs during use, the UPnP service providing apparatus 102 can resume service over the LAN 100. This appears to the UPnP control point apparatus as if the UPnP service providing apparatus 102 has been once disconnected from the network, and then newly added. According to the present embodiment, it is possible to conceal the UPnP service providing apparatus 102 with only the existing UPnP control point functionality in the UPnP control point apparatus.

Also, the proxy service apparatus 101 of the present embodiment determines whether or not a UPnP service providing apparatus 102 exists on the Bluetooth network 104 (second determination), and when a UPnP service providing apparatus 102 exists on the Bluetooth network 104, connects to the UPnP service providing apparatus 102 via the Bluetooth network 104. Therefore, it is possible to appropriately determine a circumstance in which the communications path should be switched, and provide a proxy service.

Also, the proxy service apparatus 101 of the present embodiment relays a service after confirming that providing of a service via the LAN 100 has been stopped by the UPnP service providing apparatus 102. Therefore, it is possible to prevent overlap of providing a service via the LAN 100 and relaying a service via the Bluetooth network 104.

Also, the proxy service apparatus 101 of the present embodiment transmits parameters necessary for connecting to the UPnP service providing apparatus 102 via the Bluetooth network 104 to the UPnP service providing apparatus 102 via the LAN 100. Thus, it is possible for the UPnP service providing apparatus 102 to appropriately decide whether or not to connect to the Bluetooth network 104 to use a proxy service.

Second Embodiment

A second embodiment of the present invention will now be described with reference to the drawings, focusing mainly on differences from the first embodiment. A proxy service apparatus 101 in the second embodiment uses UPnP to publish on the LAN 100 the fact that the proxy service apparatus 101 has a proxy service that provides a UPnP service proxy. In the present embodiment, publishing and use of the proxy service is performed using UPnP, but this is not a limitation; WS-Discovery and another protocol such as SOAP may also be used.

A UPnP service providing apparatus 102 in the second embodiment uses UPnP on the LAN 100 to find and use a proxy service of providing a UPnP service proxy. In the proxy service apparatus 101, when the proxy control unit 406 judges that a proxy service is possible, the SSDP processing unit 403 is used to transmit an SSDP alive message related to the proxy service on the LAN 100. Moreover, the proxy control unit 406 uses the SSDP processing unit 403 to start SSDP processing related to the proxy service for the LAN 100. It is possible to judge whether or not the proxy service is possible based on whether or not it is possible to communicate with the UPnP service providing apparatus 102 using a communications path other than the LAN 100, such as the Bluetooth network 104, for example.

When the proxy control unit 406 judges that a proxy service is not possible, the proxy control unit 406 uses the SSDP processing unit 403 to transmit an SSDP byebye message related to a proxy service on the LAN 100. Also, the proxy control unit 406 uses the SSDP processing unit 403 to end SSDP processing related to a proxy service. Thus, the UPnP service providing apparatus 102 can discover a proxy service only in a period in which it is possible to use a proxy service.

(Processing to Start Proxy Service in Proxy Service Apparatus)

Figure 15:
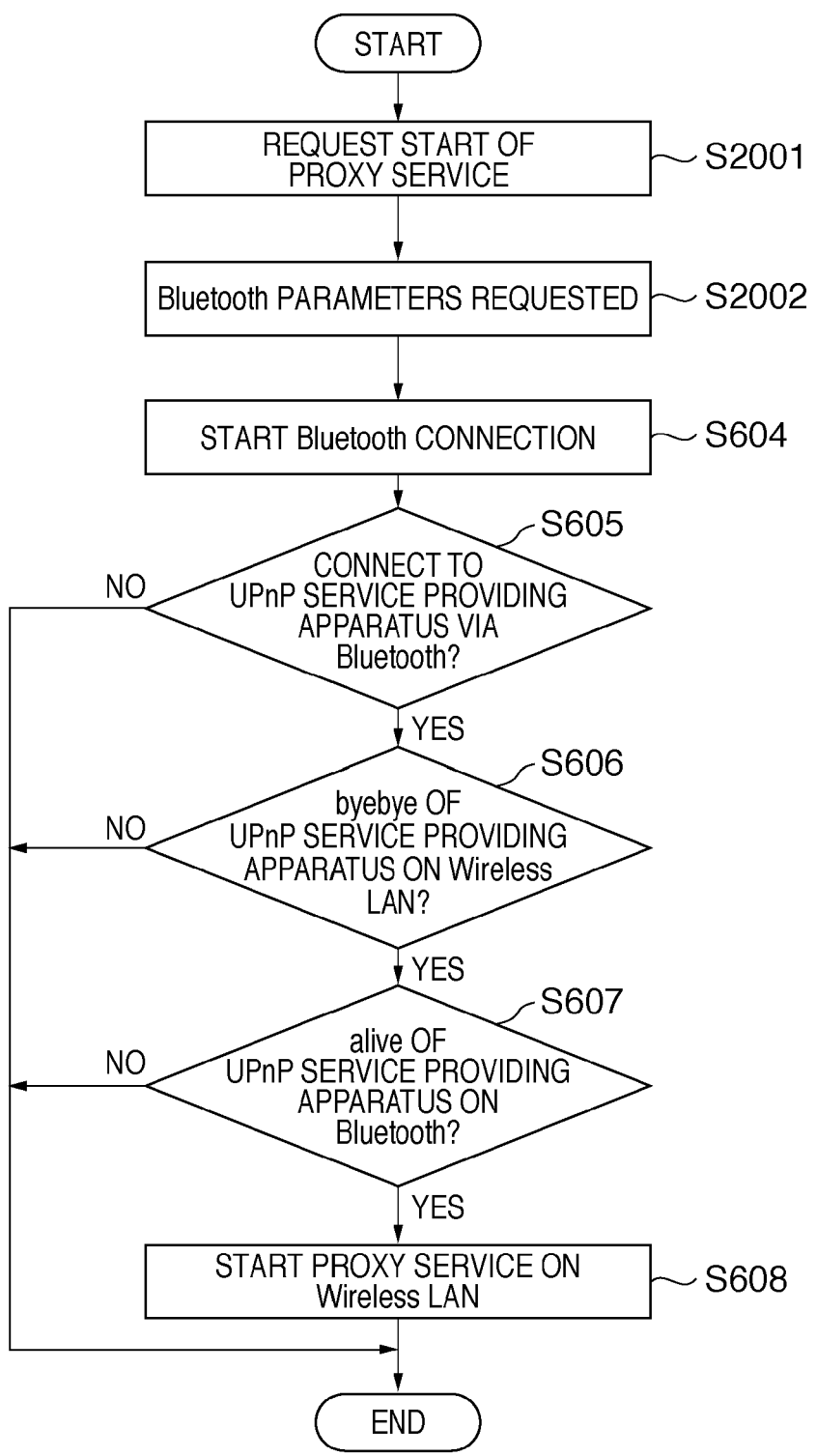
FIG. 15 is a flowchart that shows the flow of processing to start a proxy service in the proxy service apparatus 101.

FIG. 15 is a flowchart that shows the flow of processing to start a proxy service in the proxy service apparatus 101 according to the second embodiment. The differences from FIG. 6 are that Steps S601, 5602, and 5603 are deleted, and Steps S2001 and S2002 have been added.

In Step S2001, the proxy control unit 406 uses the SOAP processing unit 404 to receive a UPnP service proxy request from the UPnP service providing apparatus 102 on the LAN 100. This proxy request includes a UUID for the UPnP service providing apparatus 102. The proxy control unit 406 saves the UUID of the UPnP service providing apparatus 102 in the UUID storage unit 409, and then processing proceeds to Step S2002. Proxy service may be rejected when the proxy service apparatus 101 is already providing proxy service for another UPnP service providing apparatus.

In Step S2002, the proxy control unit 406 uses the SOAP processing unit 404 to receive a receive a request for parameters of the Bluetooth network 104 from the UPnP service providing apparatus 102 on the LAN 100. The proxy control unit 406 acquires the parameters of the Bluetooth network 104 from the Bluetooth control unit 402. The proxy control unit 406 uses the SOAP processing unit 404 to send a response with the parameters of the Bluetooth network 104 to the UPnP service providing apparatus 102, and then processing proceeds to Step S604. Operation from Step S604 onward is the same as in the first embodiment described with reference to FIG. 6, so a description thereof is omitted here.

(Processing to Start Proxy Service in Service Providing Apparatus)

Figure 16:
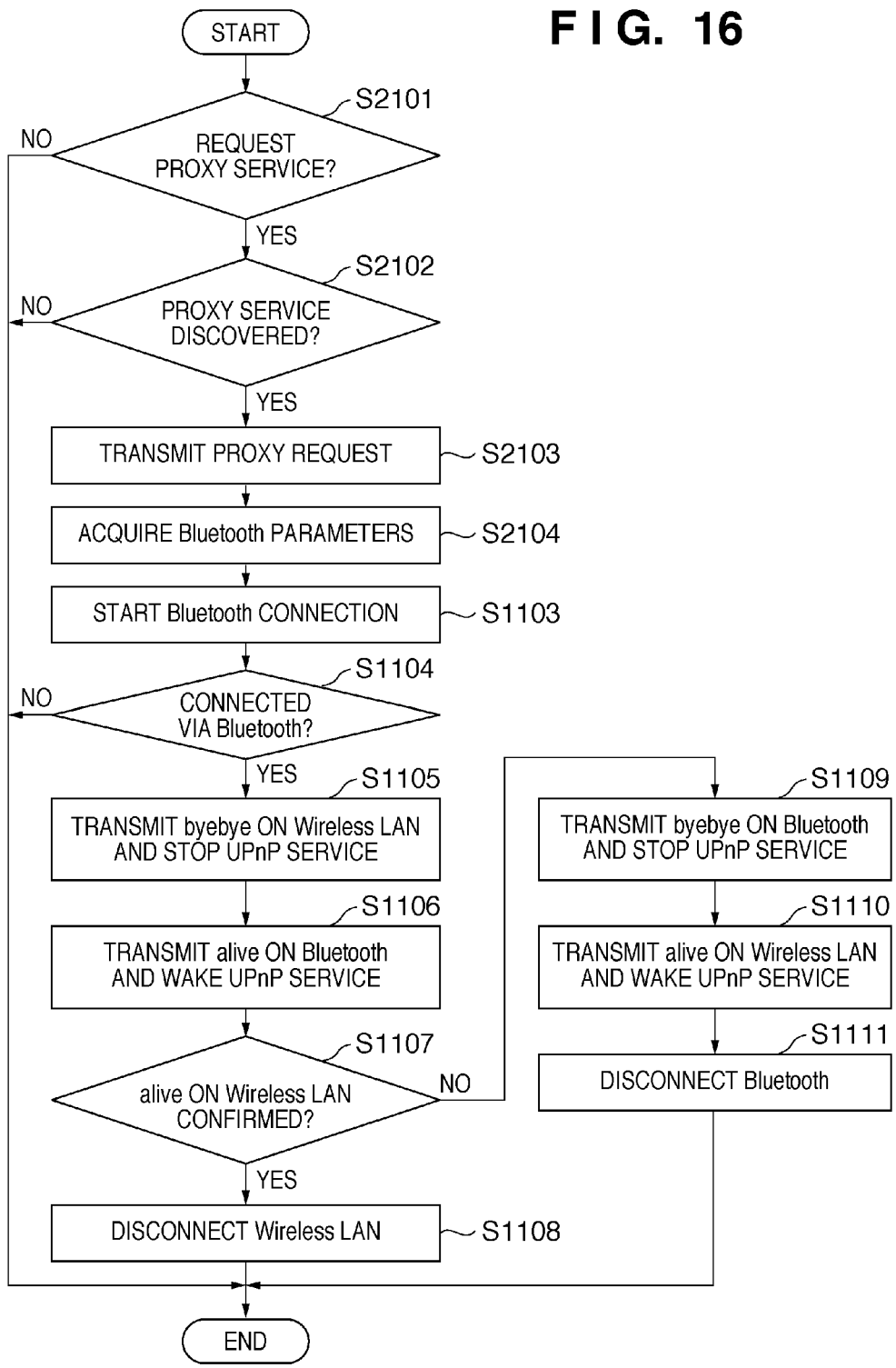
FIG. 16 is a flowchart that shows the flow of processing to start a proxy service in the UPnP service providing apparatus 102.

FIG. 16 is a flowchart that shows the flow of processing to start a proxy service in the service providing apparatus 102 according to the second embodiment. The differences from FIG. 8 are that Steps S1101 and S1102 are deleted, and Steps S2101, S2102, S2103, and S2104 have been added.

In Step S2101, the service control unit 506 judges whether or not to use a proxy service. When the service control unit 506 judges to use a proxy service (YES in Step S2101), processing proceeds to Step S2102. When the service control unit 506 judges not to use a proxy service (NO in Step S2101), processing ends.

In Step S2102, the service control unit 506 uses the SSDP processing unit 503 to search for a proxy service on the LAN 100. The SSDP processing unit 503 transmits an m-search message on the LAN 100 via the wireless LAN control unit 501 in order to search for a proxy service. The SSDP processing unit 503 sends a response to the service control unit 506 with results regarding whether there is a response from the proxy service, or whether an alive message has been received within a fixed period of time. When the service control unit 506 judges that a proxy service has been discovered (YES in Step S2102), processing proceeds to Step S2103. When the service control unit 506 judges that a proxy service has not been discovered (NO in Step S2102), processing ends.

In Step S2103, the service control unit 506 uses that SOAP processing unit 504 to request a proxy from the proxy service apparatus 101 on the LAN 100 via the wireless LAN control unit 501, and then processing proceeds to Step S2104. The proxy request includes a UUID for the UPnP service providing apparatus 102.

In Step S2104, the service control unit 506 uses that SOAP processing unit 504 to request communications parameters for other than the LAN 100 from the proxy service apparatus 101 on the LAN 100 via the wireless LAN control unit 501. When the communications parameters are acquired from the proxy service apparatus 101, the service control unit 506 acquires the parameters for the Bluetooth network 104 from these communications parameters, and then processing proceeds to Step S1103. Operation from Step S1103 onward is the same as in the first embodiment described with reference to FIG. 8, and so a description thereof is omitted here.

(Processing to Start Proxy Service in Proxy Service Apparatus and UPnP Service Providing Apparatus)

Figure 17:
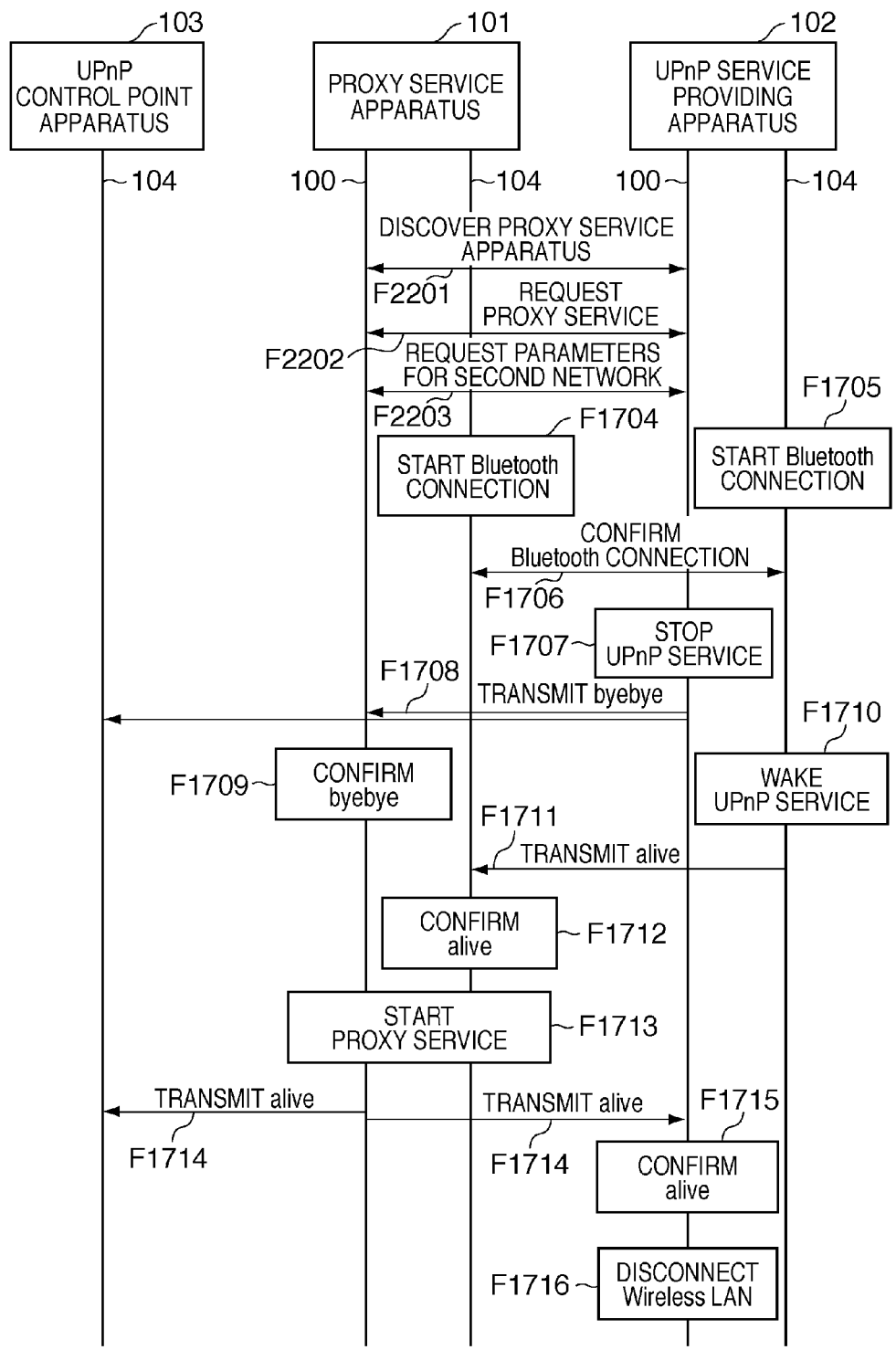
FIG. 17 is a sequence chart that shows the sequence of processing to start a proxy service.

FIG. 17 is a sequence chart that shows the sequence of processing to start a proxy service in the proxy service apparatus 101 and the UPnP service providing apparatus 102 according to the second embodiment. The differences from FIG. 12 are that F1701, F1702, and F1703 are deleted, and F2201, F2202, and F2203 have been added.

In F2201, the UPnP service providing apparatus 102 discovers the proxy service apparatus 101. In F2202, the UPnP service providing apparatus 102 requests a UPnP service proxy from the proxy service apparatus 101. In F2203, the UPnP service providing apparatus 102 requests communications parameters from the proxy service apparatus 101. Operation from Step F1704 onward is the same as in the first embodiment, and so a description thereof is omitted here.

As described above, the proxy service apparatus 101 of the present embodiment publishes to the LAN 100 the fact that the proxy service apparatus 101 has a relaying function of relaying a service. When the relaying function has been published, the UPnP service providing apparatus 102 performs switching processing of switching from directly providing a service to the UPnP control point apparatus 103 to providing a service to the proxy service apparatus 101 via the Bluetooth network 104.

Therefore, the UPnP service providing apparatus 102 is able to discover a plurality of proxy service apparatuses, and use the most appropriate proxy service apparatus among those that have been discovered. For example, when there is no proxy service for a communications unit that supports Bluetooth, it is possible to use another proxy service.

Also, when there has not been a relaying request from the UPnP service providing apparatus 102 in response to publication of the relaying function, the proxy service apparatus 101 of the present embodiment relays a service. Thus, it is possible to start relaying (providing a proxy for) a service at an appropriate time.

Third Embodiment

A third embodiment of the present invention will now be described with reference to the drawings, focusing mainly on differences from the first and second embodiments. A DMS (Digital Media Server) defined by the DLNA (Digital Living Network Alliance) is defined based on UPnP. A proxy service apparatus 101 in the present embodiment has a function of providing a proxy for a DMS. A UPnP service providing apparatus 102 in the present embodiment has the function of a DMS. A UPnP control point apparatus 103 in the present embodiment has the function of a DMP (Digital Media Player).

(Module Configuration of Proxy Service Apparatus)

Figure 4B:
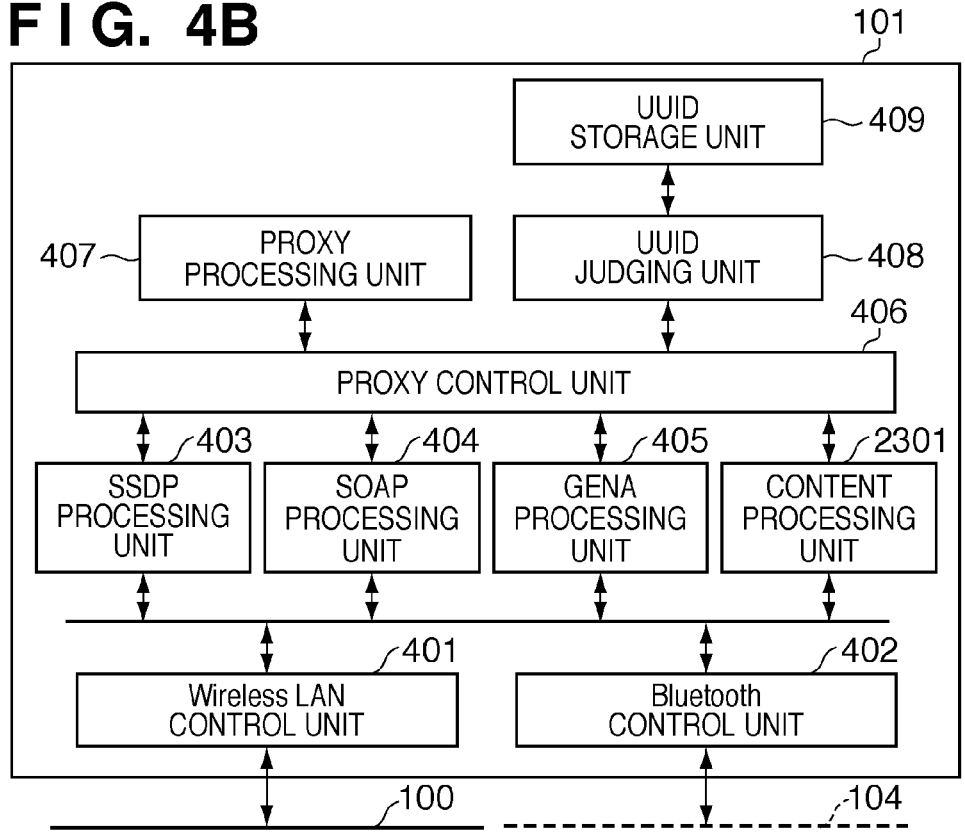

FIG. 4B shows the module configuration of the proxy service apparatus 101 of the present embodiment. Reference numeral 2301 denotes a content processing unit that has a function of receiving content from the Bluetooth control unit 402 according to a content request from the wireless LAN control unit 401. When there is a content request, the content may always be acquired in an on-demand manner, or a cache of the content processing unit may be used.

The proxy processing unit 407 has a function of rewriting a URL included in a DIDL-Lite provided from the UPnP service providing apparatus 102 to a URL that indicates the proxy service apparatus 101. When there has been a request, the proxy processing unit 407 provides a DIDL-Lite having a rewritten URL. Also, the proxy processing unit 407 rewrites a URL for content of the proxy service apparatus 101 to a URL for the corresponding UPnP service providing apparatus 102, and provides the rewritten URL. In the present embodiment, and example of rewriting the URL of a DIDL-Lite is given, but this is not a limitation; the URL of metadata other than DIDL-Lite may be rewritten.

(Module Configuration of Service Providing Apparatus)

Figure 5B:
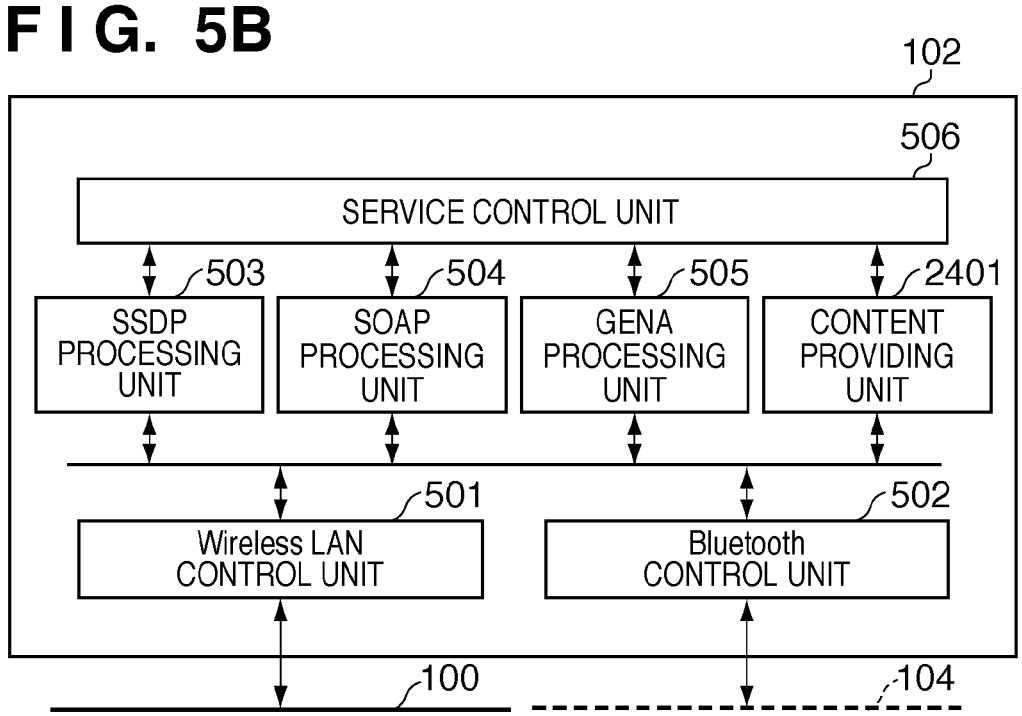

FIG. 5B shows the module configuration of the UPnP service providing apparatus 102 of the present embodiment. Reference numeral 2401 denotes a content providing unit that has a function of providing content according to a content request from the wireless LAN control unit 501 and the Bluetooth control unit 502.

In the third embodiment, an example is described in which the proxy service apparatus 101 is providing a proxy service for the UPnP service providing apparatus 102. The proxy control unit 406 uses the SOAP processing unit 404 to receive a request for (browse) a list of content from the UPnP control point apparatus 103 on the LAN 100 via the wireless LAN control unit 401. In response, the proxy control unit 406 uses the SOAP processing unit 404 to make a content list request (browse) to the UPnP service providing apparatus 102 on the Bluetooth network 104 via the Bluetooth control unit 402, and acquires a DIDL-Lite. The proxy control unit 406 transmits the acquired DIDL-Lite to the proxy processing unit 407, and requests rewriting of the DIDL-Lite. The proxy control unit 406 uses the SOAP processing unit 404 to send a response with the DIDL-Lite, which is the content list, to the UPnP control point apparatus 103 on the LAN 100 via the wireless LAN control unit 401.

The proxy control unit 406 uses the content processing unit 2301 to receive a content acquisition request from the UPnP control point apparatus 103 on the LAN 100 via the wireless LAN control unit 401. In the present embodiment, the content acquisition request is HTTP GET. The proxy control unit 406 makes a request to the proxy processing unit 407 to convert the content URL. The proxy processing unit 407 converts the content URL of the proxy service apparatus 101 to the content URL of the UPnP service providing apparatus 102, and sends a response with the converted URL to the proxy control unit 406. The proxy control unit 406 uses the content processing unit 2301 to transmit the content acquisition request to the UPnP service providing apparatus 102 on the Bluetooth network 104 via the Bluetooth control unit 402. When the proxy control unit 406 acquires the content from the UPnP service providing apparatus 102, the proxy control unit 406 uses the content processing unit 2301 to send a response with the content to the UPnP control point apparatus 103 on the LAN 100 via the wireless LAN control unit 401.

The UPnP service providing apparatus 102 receives the content acquisition request from the proxy service apparatus 101. The service control unit 506 uses the content providing unit 2401 to receive the content acquisition request from the proxy service apparatus 101 on the Bluetooth network 104 via the Bluetooth control unit 402. The service control unit 506 uses the content providing unit 2401 to send a response with the content to the proxy service apparatus 101 on the Bluetooth network 104 via the Bluetooth control unit 402.

(Content Providing Processing)

Figure 18:
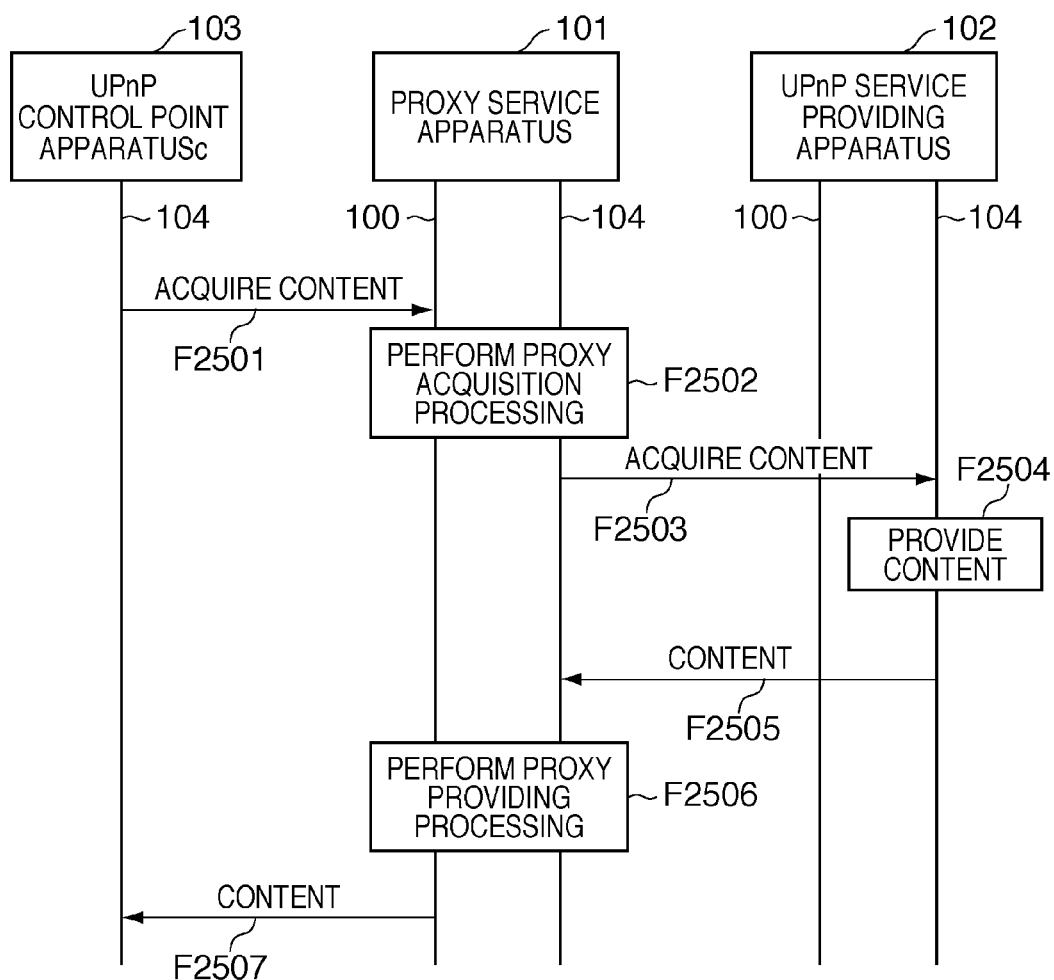
FIG. 18 is a sequence chart that shows the sequence of processing to provide content.

FIG. 18 is a sequence chart that shows the sequence of content providing processing in the proxy service apparatus 101 and the UPnP service providing apparatus 102 according to the third embodiment. In F2501, the UPnP control point apparatus 103 makes a request for content acquisition to the proxy service apparatus 101 via the LAN 100. In F2502, the proxy service apparatus 101 executes proxy processing such as URL rewriting according to the acquisition of content received via the LAN 100. In F2503, the proxy service apparatus 101 transmits a request for content acquisition to the UPnP service providing apparatus 102 via the Bluetooth network 104.

In F2504, the UPnP service providing apparatus 102 receives the request for content acquisition from the proxy service apparatus 101 via the Bluetooth network 104. The UPnP service providing apparatus 102 provides content corresponding to the content acquisition request. In F2505, the UPnP service providing apparatus 102 transmits the content to the proxy service apparatus 101 via the Bluetooth network 104. In F2506, the proxy service apparatus 101 executes proxy processing such as URL rewriting according to the content received via the Bluetooth network 104. In F2507, the proxy service apparatus 101 transmits the content to the UPnP control point apparatus 103 via the LAN 100.

A transfer protocol other than HTTP, for example such as RTP, may also be used in the present embodiment. In such a case, the invention can be realized by the content processing unit 2301 in the proxy service apparatus 101 having the function of an RTP proxy, and the content providing unit 2401 in the UPnP service providing apparatus 102 having an RTP distribution function.

As described above, in the example in the present embodiment, the service relayed (for which a proxy is provided) by the proxy service apparatus 101 is not a UPnP service, but rather a content distribution service. When a content distribution request has been received from the UPnP control point apparatus 103 via the LAN 100, the proxy service apparatus 101 performs rewrite processing to rewrite the content distribution request such that the destination for content distribution is the proxy service apparatus 101. Then, the rewritten content distribution request is output to the UPnP service providing apparatus 102 via the Bluetooth network 104. When distributed content is received from the UPnP service providing apparatus 102 due to the rewritten content distribution request being output, the received content is distributed to the UPnP control point apparatus 103.

Therefore, also in the case of a service such as content distribution, it is possible to appropriately relay the service provided between the UPnP service providing apparatus 102 and the UPnP control point apparatus 103. As described above, in the configuration of the present embodiment, it is possible to provide a service, and possible to provide content that is being provided by the service. In the present embodiment, an example is described in which a content request is transferred, but performing transfer is not a limitation. For example, an embodiment of the invention is possible in which a copy of content is acquired in advance, and the copy is provided.

According to the above configuration, it is possible to conceal a service providing apparatus by the proxy service apparatus changing the network connection of the service providing apparatus. Moreover, the service providing apparatus receives messages only from the proxy service apparatus, so the service providing apparatus is secure. When UPnP is used, the service is published equally to any network, so this configuration is effective particularly when a connection has been made to a network outside of a user's home (for example, a network at a friend's home).

According to the present invention, it is possible to provide technology whereby security is increased when providing a service.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application NO. 2009-029115, filed on Feb. 10, 2009, which is hereby incorporated by reference herein in its entirety.

What is claimed is:

1. An information processing apparatus comprising:
a first communication unit adapted to communicate via a first network;
a second communication unit adapted to communicate via a second network;
a first detection unit adapted to detect a disconnection of a service providing apparatus, which provides a UPnP service on the first network, from the first network;
a second detection unit adapted to detect the service providing apparatus on the second network based on communication by the second communication unit connecting to the service providing apparatus on the second network via Bluetooth;
a proxy unit adapted to perform a proxy process, on the first network, for a service provided by a service providing apparatus, in a case that the first detection unit detects the disconnection of the service providing apparatus from the first network and the second detection unit detects the service providing apparatus on the second network;
a memory adapted to store a program; and
a processor adapted to function as at least one of the units by executing the program stored on the memory.

2. The information processing apparatus according to claim 1, wherein the second communication unit connects to the service providing apparatus via the second network.

3. The information processing apparatus according to claim 1, wherein the proxy unit provides the proxy process based on the communication by the first communication unit via the first network.

4. The information processing apparatus according to claim 1, further comprising a transmission unit adapted to transmit, to the service providing apparatus via the first network, parameters necessary for connecting to the service providing apparatus via the second communications unit.

5. The information processing apparatus according to claim 1, further comprising a publishing unit adapted to send a signal for publishing to the first network the fact that the information processing apparatus has a proxy function of providing a proxy for the service.

6. An information processing system having a control apparatus, a service providing apparatus that provides a service to the control apparatus, and an information processing apparatus that provides a proxy for the service, the information processing apparatus comprising:
a first communication unit adapted to communicate via a first network;
a second communication unit adapted to communicate via a second network;
a first detection unit adapted to detect a disconnection of a service providing apparatus which provides a UPnP service on the first network, from the first network;
a second detection unit adapted to detect the service providing apparatus on the second network based on communication by the second communication unit connecting to the service providing apparatus on the second network via Bluetooth;
a proxy unit adapted to perform the a proxy process, on the first network, for a service provided by the service providing apparatus, in a case that the first detection unit detects the disconnection of the service providing apparatus from the first network and the second detection unit detects the service providing apparatus on the second network;
a memory adapted to store a program; and
a processor adapted to function as at least one of the units by executing the program stored on the memory.

7. A method for controlling an information processing apparatus that comprises a first communications unit adapted to communicate via a first network and a second communications unit adapted to communicate via a second network, the method comprising:
a first detection step of detecting a disconnection of a service providing apparatus, which provides a UPnP service on the first network, from the first network;
a second detection step of detecting the service providing apparatus on the second network based on communication by the second communication unit connecting to the second network on the second network via Bluetooth; and
a proxy step of performing a proxy process, on the first network, for a service provided by a service providing apparatus, in a case that the disconnection of the service providing apparatus from the first network is detected in the first detection step and the service providing apparatus on a second network is detected in the second detection step.

8. A non-transitory computer-readable recording medium storing a program causing a computer to function as an information processing apparatus comprising:

a first communication unit adapted to communicate via a first network;
a second communications unit adapted to communicate via a second network;
a first detection unit adapted to detect a disconnection of a service providing apparatus, which provides a UPnP service on the first network, from the first network;
a second detection unit adapted to detect the service providing apparatus on the second network based on communication by the second communication unit connecting to the service providing apparatus on the second network via Bluetooth; and
a proxy unit adapted to perform the a proxy process, on the first network, for a service provided by a service providing apparatus, in a case that the first detection unit detects the disconnection of the service providing apparatus from the first network and the second detection units detects the service providing apparatus on the second network.

9. The information processing apparatus according to claim 1, wherein a power consumption of the service providing apparatus in a case that said information processing apparatus performs the proxy process is lower than the power consumption of the service providing apparatus in a case that said service providing apparatus connects to the first network.

10. The information processing apparatus according to claim 1, further comprising:
a search unit adapted to search for the service providing apparatus in the first network using the first communication unit;
a determination unit adapted to determine whether the service providing apparatus that is searched for by the search unit has requested for the proxy process; and
a transmission unit adapted to transmit, to the service providing apparatus via the first network, parameters necessary for connecting to the service providing apparatus via the second communications unit in a case that the determination unit determines that the service providing apparatus has requested for the proxy process,
wherein the proxy unit performs the proxy process in a case that the first detection unit detects the disconnection of the service providing apparatus from the first network after the transmission by the transmission unit and the second detection unit detects the service providing apparatus on the second network after the transmission by the transmission unit.

11. The information processing apparatus according to claim 1, wherein the first communication unit communicates via wireless LAN.

12. The information processing apparatus according to claim 1, wherein said proxy process is a process by the information processing apparatus for, in response to a content request from an apparatus connected to the first network to said service providing apparatus, providing the requested content to said apparatus connected to the first network without releasing a sleep state of the service providing apparatus.

13. The information processing apparatus according to claim 1, further comprising:
a third detection unit adapted to detect an identifier of the service providing apparatus based on communication by the first communication unit on the first network;
a fourth detection unit adapted to detect an identifier of an apparatus connected to the second network based on communication by the second communication unit on the second network; and
a judging unit adapted to judge, in a case that the first communication unit receives from the service providing apparatus information indicating to end communication via the first network, whether or not an identifier detected by the third detection unit matches an identifier detected by the fourth detection unit,
wherein the proxy unit is adapted to perform the proxy process on the first network in a case that the judging unit judges that the identifier detected by the third detection unit matches the identifier detected by the fourth detection unit.

14. The information processing apparatus according to claim 5, wherein the proxy unit provides a proxy for the service on the first network when a request for the proxy has been made from the service providing apparatus.

* * * * *